(12) United States Patent
Steinberg et al.

(10) Patent No.: US 10,410,533 B2
(45) Date of Patent: Sep. 10, 2019

(54) PORTAL ASSESSMENT DESIGN SYSTEM FOR EDUCATIONAL TESTING

(71) Applicant: Educational Testing Service, Princeton, NJ (US)

(72) Inventors: Linda Steinberg, Pennington, NJ (US); Robert J. Mislevy, Severna Park, MD (US); Russell G. Almond, Tallahassee, FL (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 14/180,456

(22) Filed: Feb. 14, 2014

(65) Prior Publication Data

US 2014/0193792 A1 Jul. 10, 2014

Related U.S. Application Data

(63) Continuation of application No. 10/913,777, filed on Aug. 6, 2004, now Pat. No. 8,651,873, and a
(Continued)

(51) Int. Cl.
*G09B 5/00* (2006.01)
*G09B 5/08* (2006.01)
*G09B 7/00* (2006.01)

(52) U.S. Cl.
CPC ............... *G09B 5/08* (2013.01); *G09B 5/00* (2013.01); *G09B 7/00* (2013.01)

(58) Field of Classification Search
CPC ............... G09B 5/00; G09B 7/00; G09B 7/02
(Continued)

(56) References Cited

U.S. PATENT DOCUMENTS 4,930,077 A 5/1990 Fan
5,827,070 A * 10/1998 Kershaw ............... G09B 7/02
434/118
(Continued)

OTHER PUBLICATIONS

Almond, Russell, Dibello, L., Jenkins, F., Senturk, D., Mislevy, Robert, Steinberg, Linda, Yan, Duanli; Models for Conditional Probability Tables in Educational Assessment; In Artificial Intelligence and Statistics 2001: Proceedings of the 8th International Workshop; Morgan Kaufmann Publishers: San Francisco, CA; pp. 137-143; 2001.
(Continued)

*Primary Examiner* — Peter R Egloff
(74) *Attorney, Agent, or Firm* — Jones Day

(57) ABSTRACT

A Portal Assessment Design System includes a system for designing assessment models and assessments (e.g., standardized tests). In assessment design, specifications are organized around three basic elements: 1) what knowledge, skill or abilities are important to measure; 2) what is necessary evidence of that knowledge, skill or ability; 3) what performance situations are needed to elicit the required evidence from students and other assessment users. The system includes three modules (i.e., Domain Analysis, Domain Modeling, Conceptual Assessment Framework), each of which targets a specific phase of the design process, for designing an assessment in accordance with the three basic elements. The sequence of modules represents the structure of a design process that helps assessment developers work through successive stages or phases of assessment design, from the gathering of raw information to the creation of a complete set of specifications for an assessment product. Each module has its own set of objects for organizing information, such as knowledge skills and abilities of interest of the students being tested, evidence of these, and situations structured to elicit this evidence. The modules and objects of the system are implemented as a software application executing in a client-server environment.

20 Claims, 26 Drawing Sheets

Related U.S. Application Data continuation of application No. 10/080,533, filed on Feb. 22, 2002, now abandoned.

(58) Field of Classification Search
USPC .................................. 434/322, 323, 365
See application file for complete search history.

(56) References Cited

U.S. PATENT DOCUMENTS

| | | | | |
|---|---|---|---|---|
| 5,841,655 | A | * | 11/1998 | Stocking ............... G06Q 10/10 700/83 |
| 5,879,165 | A | * | 3/1999 | Brunkow et al. ............ 434/322 |
| 6,018,617 | A | * | 1/2000 | Sweitzer ............... G06F 17/215 358/1.1 |
| 6,085,206 | A | | 7/2000 | Domini et al. |
| 6,112,049 | A | | 8/2000 | Sonnenfeld |
| 6,149,441 | A | * | 11/2000 | Pellegrino et al. ........... 434/350 |
| 6,164,974 | A | | 12/2000 | Carlile et al. |
| 6,181,909 | B1 | | 1/2001 | Burstein et al. |
| 6,259,890 | B1 | * | 7/2001 | Driscoll et al. .............. 434/350 |
| 6,269,368 | B1 | | 7/2001 | Diamond |
| 6,341,212 | B1 | | 1/2002 | Shende et al. |
| 6,431,875 | B1 | | 8/2002 | Elliott et al. |
| 6,473,730 | B1 | | 10/2002 | McKeown et al. |
| 6,513,042 | B1 | | 1/2003 | Anderson et al. |
| 6,527,556 | B1 | * | 3/2003 | Koskinen ...................... 434/219 |
| 6,604,084 | B1 | * | 8/2003 | Powers et al. ............... 705/7.41 |
| 6,685,482 | B2 | * | 2/2004 | Hopp et al. .................... 434/323 |
| 6,704,741 | B1 | * | 3/2004 | Lively et al. |
| 6,721,756 | B2 | | 4/2004 | Yagihashi et al. |
| 6,948,153 | B2 | * | 9/2005 | Bowers ............... G06F 11/3684 434/323 |
| 2002/0046018 | A1 | | 4/2002 | Marcu et al. |
| 2002/0127521 | A1 | * | 9/2002 | Fegan ....................... G09B 7/02 434/118 |
| 2002/0142277 | A1 | | 10/2002 | Burstein et al. |
| 2003/0008270 | A1 | | 1/2003 | Fleishman |
| 2003/0039949 | A1 | * | 2/2003 | Cappellucci et al. ......... 434/362 |

OTHER PUBLICATIONS

Almond, Russell, Herskovits, Edward, Mislevy, Robert, Steinberg, Linda; Transfer of Information Between System and Evidence Models; In Artificial Intelligence and Statistics, D. Heckerman & J. Whittaker (Eds.); Morgan Kaufmann: San Francisco, CA; 1999.

Almond, Russell, Steinberg, Linda, Mislevy, Robert; A Sample Assessment Using the Four Process Framework; Center for Studies in Education Technical Report 543; 2000.

Almond, Russell, Mislevy, Robert, Steinberg, Linda; Using Prototype-Instance Hierarchies to Model Global Dependence; AMS Summer Research Conference on Graphical Markov Models, Influence Diagrams, and Bayesian Belief Networks; Seattle, WA; 1997.

Almond, Russell, Matukhin, Alexander, Steinberg, Linda, Williamson, David, Yan, Duanli; A Framework for Evidence Accumulation; Educational Testing Service, White Paper; 2002.

Almond, Russell, Matukhin, Alexander, Steinberg, Linda, Sinharay, Sandip, Williamson, David, Yan, Duanli; A Framework for Calibrating Evidence Models; Educational Testing Service, White Paper; 2002.

Bauer, Malcolm, Williamson, David, Steinberg, Linda, Mislevy, Robert, Behrens, John; How to Create Complex Measurement Models: A Case Study of Principled Assessment Design; Presented at the Annual Meeting of the National Council of Measurement in Education; Seattle, WA; 2001.

Bejar, Isaac; Speculations on the Future of Test Design; Ch. 10 in Test Design: Developments in Psychology and Psychometrics, S.E. Embretson (Ed.); pp. 279-294; 1985.

Callear, David, Jerrams-Smith, Jennifer, Soh, Victor; Bridging Gaps in Computerised Assessment of Texts; Proceedings of the IEEE International Conference on Advanced Learning Techniques; pp. 139-140; 2001.

Cameron, Cheryl, Beemsterboer, Phyllis, Johnson, Lynn, Mislevy, Robert, Breyer, F. Jay; A Cognitive Task Analysis for Dental Hygiene; Journal of Dental Education, 64; pp. 333-351; 1999.

Carpeter, Patricia, Just, Marcel Adam, Shell, Peter; What One Intelligence Test Measures: A Theoretical Account of the Processing in the Raven Progressive Matrices Test; Psychological Review, 97(3); pp. 404-431; 1990.

Cross, K. Patricia, Wiggins, Grant, Hutchings, Pat; Assessment 1990: Understanding the Implications; Proceedings of the 5th AAHE Conference on Assessment in Higher Education; 1990.

Embretson, Susan; A Cognitive Design System Approach to Generating Valid Tests: Application to Abstract Reasoning; Psychological Methods, 3(3); pp. 380-396; 1998.

Foa, Uriel; New Developments in Facet Design and Analysis; Psychological Review, 72(4); pp. 262-274; 1965.

Gitomer, Drew, Steinberg, Linda; Representational Issues in Assessment Design; Ch. 16 in The Development of Representational Thought: Theories and Applications, I. Sigel (Ed.); Erlbaum: Hillsdale, NJ; pp. 351-369; 1999.

Gitomer, Drew, Steinberg, Linda, Mislevy, Robert; Diagnostic Assessment of Troubleshooting Skill in an Intelligent Tutoring System; In Cognitively Diagnostic Assessment, P. Nichols, S. Chipman and S. Brennan (Eds.); Erlbaum: Hillsdale, NJ; 1995.

Hively, Wells, Patterson, Harry, Page, Sara; A "Universe-Defined" System of Arithmetic Achievement Tests; Journal of Educational Measurement, 5(4); pp. 275-290; 1968.

Hornke, Lutz, Habon, Michael; Rule-Based Item Bank Construction and Evaluation Within the Linear Logistic Framework; Applied Psychological Measurement, 10(4); pp. 369-380; 1986.

Mayer, Richard; Frequency Norms and Structural Analysis of Algebra Story Problems Into Families, Categories, and Templates; Instructional Science, 10; pp. 135-175; 1981.

Messick, Samuel; The Interplay of Evidence and Consequences and Validation of Performance Assessments; Educational Researcher, 23(2); pp. 13-23; 1994.

Mislevy, Robert, Steinberg, Linda, Almond, Russell; On the Roles of Task Model Variables in Assessment Design; In Generating Items for Cognitive Tests: Theory and Practice, S. Irvine & P. Kyllonen (Eds.); Erlbaum: Hillsdale, NJ; 1999.

Mislevy, Robert, Steinberg, Linda, Almond, Russell, Breyer, F. Jay, Johnson, Lynn; Making Sense of Data From Complex Assessments; Applied Measurement in Education, 15(4); pp. 363-389; 2002.

Mislevy, Robert, Steinberg, Linda, Almond, Russell, Haertel, Geneva, Punuel, William; Leverage Points for Improving Educational Assessment; Principled Assessment Designs for Inquiry, Technical Report 2; SRI International; 2003.

Mislevy, Robert, Almond, Russell, Yan, Duanli, Steinberg, Linda; Bayes Nets in Educational Assessment: Where the Numbers Come From; In Proceedings of the 15th Conference on Uncertainty in Artificial Intelligence; K.B. Laskey & H. Prade (Eds.); pp. 437-446; 1999.

Mislevy, Robert, Steinberg, Linda, Breyer, F. Jay, Almond, Russell, Johnson, Lynn; A Cognitive Task Analysis, With Implications for Designing a Simulation-Based Performance Assessment; Center for the Study of Evaluation, Technical Report 487; 1998.

Mislevy, Robert, Almond, Russell, Steinberg, Linda; A Note on Knowledge-Based Model Construction in Educational Assessment; Center for the Study of Evaluation, Technical Report 480; 1998.

Mislevy, Robert, Steinberg, Linda, Almond, Russell; Evidence-Centered Assessment Design; Presented at the Annual Conference of the National Center for Research on Evaluation, Standards, Student Testing; University of California at Los Angeles; 1998.

Mislevy, Robert, Steinberg, Linda, Almond, Russell; On the Structure of Educational Assessments; Measurement: Interdisciplinary Research and Perspective, 1(1); pp. 3-62; 2003.

Osburn, H. G.; Item Sampling for Achievement Testing; Educational and Psychological Measurement, 28; pp. 95-104; 1968.

Steinberg, Linda, Gitomer, Drew; Intelligent Tutoring and Assessment Built on an Understanding of a Technical Problem-Solving Task; Instructional Science, 24; pp. 223-258; 1996.

(56) References Cited

OTHER PUBLICATIONS

Steinberg, Linda, Gitomer, Drew; Cognitive Task Analysis and Interface Design in a Technical Troubleshooting Domain; Knowledge-Based Systems, 6(4); pp. 249-257; 1993.

Sternberg, Robert, McNamara, Timothy; The Representation and Processing of Information in Real-Time Verbal Comprehension; Ch. 2 in Test Design: Developments in Psychology and Psychometrics, S. Embretson (Ed.); Academic Press: Orlando, FL; pp. 21-43; 1985.

Wainer, Howard, Steinberg, Linda; Sex Differences in Performance on the Mathematics Section of the Scholastic Aptitude Test: A Bidirectional Validity Study; Harvard Educational Review, 62(5); pp. 323-336; 1992.

Wiggins, Grant, McTighe, Jay; Understanding by Design; Association for Supervision and Curriculum Development; 1998.

Wiggins, Grant; Educative Assessment: Designing Assessments to Inform and Improve Student Performance; Jossey-Bass Publishers: San Francisco, CA; 1998.

Wiggins, Grant; Assessing Student Performance: Exploring the Purpose and Limits of Testing; Jossey-Bass Publishers: San Francisco, CA; 1993.

Wiley, David, Haertel, Edward; Extended Assessment Tasks: Purposes, Definitions, Scoring, and Accuracy; Ch. 4 in Implementing Performance Assessment, M. Kane & R. Mitchell (Eds.); Lawrence Erlbaum Associates: Mahwah, NJ; pp. 61-89; 1996.

Embretson, Susan; Multicomponent Latent Trait Models for Test Design; In Test Design: Developments in Psychology and Psychometrics, S. Embretson (Ed.); Academic Press: Orlando, FL; 1985.

Hearst, M.; The Debate on Automated Essay Grading; Intelligent Systems and Their Applications, 15(5); pp. 22-27; 2000.

Mislevy, Robert, Almond, Russell, Steinberg, Linda; Evidentiary Considerations in Performance Assessment; Presented at the Annual Meeting of the National Counsel of Measurement in Education; Montreal, Canada; 1999. [Educational Measurement: Issues and Practice, 17(4); pp. 39-44; Dec. 1998.].

Mislevy, Robert, Almond, Russell, Steinberg, Linda; Task Design, Student Modeling, and Evidentiary Reasoning in Complex Educational Assessments; Poster session presented at the Joint Statistical Meetings, under ASA Section on Bayesian Statistics; Los Angeles, CA; 1997.

Osterlind, Steven; Constructing Test Items: Multiple-Choice, Constructed-Response, Performance, and Other Formats, 2d Edition; Kluwer Academic Publishers: Boston, MA; 1998.

\* cited by examiner

Edit Descriptor Of Performance Outcomes And Behavior

Name: Data Organization - Scoring Obs

Description:
This describes possible outcomes for organizing data so that it can be interpreted.

| Properties | Pedigree | Hierarchies | Notes |

Possible Values:
[Add]

Effective data organization
Somewhat effective data organization
Ineffective data organization Keywords:

Roles:
☑ Observable
☐ Consolidation

[Add] [Remove]

[OK] [Save] [Cancel] [Help]

---

Edit Descriptor Of Performance Outcomes And Behavior

Name: Data/Model Relationships - Scoring Obs

Description:
This describes possible outcomes in relating patterns of data to particular models.

| Properties | Pedigree | Hierarchies | Notes |

Possible Values:
[Add]

Data and model(s) related appropriately
Data and model(s) related somewhat appropriately
Data and model(s) not related Keywords:

Roles:
☑ Observable
☐ Consolidation

[Add] [Remove]

[OK] [Save] [Cancel] [Help]

PORTAL ASSESSMENT DESIGN SYSTEM FOR EDUCATIONAL TESTING

CROSS-REFERENCE TO RELATED APPLICATIONS

This patent application is a continuation of U.S. patent application Ser. No. 10/913,777, filed Aug. 6, 2004, entitled "Portal Assessment Design System For Educational Testing," which is a continuation of U.S. patent application Ser. No. 10/080,533, filed Feb. 22, 2002, entitled "Portal Assessment Design System For Educational Testing," the entirety of both of which is herein incorporated by reference.

FIELD OF THE INVENTION

The invention is generally related to evidence-centered assessment design, which may be implemented for educational testing. More particularly, the invention is related to an assessment design system for constructing assessment models, which may be-used to generate tests for any educational purpose.

BACKGROUND OF THE INVENTION

In the world of educational assessment, assessment design is just beginning to emerge as a discipline, as a practice, and as an application for a number of reasons. An assessment is a machine for reasoning about what students know, can do, or have accomplished, based on a handful of things they say, do, or make in a particular setting. Any assessment is more than this, of course. All assessments are embedded in a cultural setting, and address social purposes both stated and implicit. Assessments communicate values, standards and expectations. Some assessments are opportunities to extend learning. Other assessments don't even look like assessments as we usually think of them (i.e., as high-stakes standardized tests); they look like conversations between students and teachers, or one student with another.

In assessment design, our concern is with the scheme that they all have in common: the reasoning that relates the particular things students say or do, to what they know or can do as more broadly conceived. Therefore, assessment design is the creation of the underlying scheme that governs the implementation, delivery and maintenance of an assessment. In educational assessment (also known as educational testing) the relevant underlying scheme is the validity argument, i.e., the model-based substantive and statistical argument that constitutes a defensible rationale for using a particular assessment for a particular purpose. Assessment design entails the development, construction and arrangement of specialized information elements, or assessment design objects, into specifications that represent the model-based validity argument that underlies any educational assessment.

To our knowledge, the Portal Assessment Design System of the present invention is the only assessment design system in existence. This section includes a description of prior art generally related to the emerging discipline encompassing the Portal Assessment Design System of the present invention.

1. Prior Art/Background

In historical terms, the idea of assessment and assessment (test) development has been powerfully shaped by the conventions and constraints related to the universal use of standardized assessments for high-stakes (selection) purposes. The requirements for inexpensive administration under standardized conditions for very large numbers of individuals in widely varying environments distributed over large geographic areas led to the development of a conventional assessment delivery system whose processes included 1) paper and pencil in combination with multiple choice response item format for assessment presentation; 2) simple key matching algorithms for evaluating responses; 3) number right summary scores; and 4) linear item selection. While such processes dictate only the form of assessment, as opposed to anything related to the substance of assessment, this delivery paradigm has, in fact, had a profound impact on substance. In particular, the use of multiple choice response format has resulted in test developers' constructing items that depend more on recognition and recall than on more sophisticated cognitive processes. This is because such complex items are not only much more difficult to develop, but also the amount of information available in any given response is constrained by the multiple response option format, making the extra time needed to perform such items not cost effective. This constraint on information has led test developers to trade off between quantity and quality, the rationale being that the more observations collected within a given time, the more information and, therefore, the more reliable (albeit rudimentary) the assessment (Wiley & Haertel, 1996).

Even as certain processes in assessment delivery have evolved (e.g., the use of item response theory, adaptive item selection algorithms, and computer presentation of assessments), little has changed to impact the focus on particular 'item types.' By item type we mean items developed at some point in the past whose content and format have become inextricably linked with the assessment of particular proficiencies. Item types are typically characterized in terms of their performance components or features; the linkage between them and the proficiencies they purport to assess is not rationalized via a substantive validity argument but can only be demonstrated post hoc empirically/statistically. An important thing to note about item types is that they are usually developed not only as specific artifacts of constructs but also of purpose; that is, an item type frequently originates as a means not only of testing a particular proficiency, but a particular proficiency for a particular purpose. Unfortunately, this conflation of construct and purpose in the item type result in the inappropriate use of item types in assessments with different purposes and has worked against change in assessment development practices.

Another obstacle to change is that the standardized testing paradigm has led to assumptions about the purpose of assessment and an accompanying lack of attention to how change in purpose effects all aspects of assessment Common practice is to use the same assessment for different purposes (the most common example is using 'old' high-stakes tests in classroom situations to support learning). When purpose changes, the requirement for reliability, among other things, also changes; this opens the door to different approaches to test development which have not really worked their way into its practice.

Maintenance of the test development status quo has also been encouraged by the language of assessment that the standardized testing paradigm has spawned. Discussions of educational assessment commonly include references to 'multiple-choice tests' or 'performance assessments' or 'computer-based tests,' none of which addresses what purpose is to be achieved. A common misconception related to the use, or purpose, of assessment is that test scores can be interpreted to make any claim of interest to any audience for information. Again, there is a lack of attention to the impact of purpose on all aspects of the content and structure of an assessment.

2. Prior Art/Current Practice

Current assessment design practice, with related tools and principals that guide and support it, is, in general, carried out from either a task-centered perspective or a cognitive and/or measurement model-centered perspective. Current principals, tools and guidance focusing on task (item) development entail implicit assumptions about the claims and evidence associated with the assessment. Current principals, tools and guidance focusing on cognitive models or measurement models (i.e., quantitative approaches to integrating evidence) entail implicit assumptions about the entire substance of the validity argument in terms of its relationship to the purpose of the assessment, beginning with the specific inferences that must be supported by evidence to achieve the purpose.

Task-Based Perspective:

The preponderance of what passes for assessment design falls into the task-centered category. The most salient feature of work done from this perspective is that item or task development is commonly conflated with item authoring. That is, there are many tools for authoring (implementing) items which assume the existence of a design. In fact, the only design that test developers typically have stated explicitly is the test specification. The test specification contains all the information needed to assemble item forms, pools and/or vats: how many of which item types, at what levels of difficulty, and covering what kind of content need to be included. A test specification does not rationalize item types in of terms claims and evidence. A test specification, therefore, assumes the majority of the substantive validity argument—assumes that these items will provide the evidence needed to support the inferences relevant to the assessment. Given a design restricted to the specification of item types, it is a natural and predictable consequence that test development actually focuses on authoring support for item types. By authoring support we mean tools and systems that allow for the stand-alone development of assessment items or tools and systems incorporated into assessment delivery mechanisms that can generate or author items 'on-the-fly.'

Authoring systems commonly provide physical models of item types, as opposed to content models (like task models and task specifications in the Portal Assessment Design System). A physical model lays out the formatting characteristics for an item model: the absence or presence of stimulus material, the format of instructions to those taking the assessment, the format of the prompt, and format of response options (for multiple choice response items). Design of the item in terms of features that may affect its difficulty or its construct-relevance happens only in the head of the item developer as they use the physical model to author an item. Therefore, the actual content of items is made up de novo over and over again. Common guidelines for test development may evolve in any particular item development environment; these may or may not be formalized. Even so, formal expressions of such guidelines again are related to particular item models (for example, Osterlind, 1999) or, more generally, to the culture of assessment as it relates to sensitivity or motivational issues.

Cognitive/Measurement Model Perspective:

Cognitive theory is useful in illuminating the construct of interest in an assessment, but is not sufficient in and of itself to specify the claims (inferences) relevant to achieving the purpose of a particular assessment, the evidence required to support these claims, and the tasks necessary to elicit that evidence (for example, see Foa, 1965). Measurement models represent the quantification of how observations of student work or behavior change our estimates of their knowledge and/or skill. They are the mathematical machinery that operationalizes the relationship between evidence and proficiency. A consideration of statistical properties of items as the vehicle for test design results in the following kind of validity argument: '. . . the question of what the test is measuring is operationally defined by the universe of content as embodied in the item generating rules' (Osborn, 1968). This is design by test specification, or backwards engineering of a validity argument from empirical data.

Other:

Some approaches mix a focus on constructs with a focus on tasks. This is where the understanding of knowledge, skill or ability is extracted from the study of the construct in the context of particular assessments. Then item types, or models, are developed to target the construct. However, the purpose of the assessments in which the construct is studied are not taken into account, which leads to the development of item models (types) that may not be appropriate for use with assessment of the construct for a different purpose—e.g., diagnosis for learning as opposed to selection (for examples, see Embretson, 1985; Sternberg & McNamara 1985). Throughout, knowledge/skills and tasks are directly connected without any explicit definition of the characteristics of student work that would support the inferences relevant to the assessment. Further, "The most difficult part of any measurement process involves the specification of its intents in a fashion that leads to effective measurement outcomes. There is little guidance for this key part, especially as new. Complex tasks are incorporated into the process. The traditional multiple-choice procedures are colored by the subtest homogeneity paradigm. That is, subtest are given labels that, at least functionally, describe types of items rather than abilities. Where test specifications within subtests are created they mix these item type specifications with skill specifications that don't link easily to curricular goal frameworks. These frameworks, where they exist, are seldom linked to subtask labels except by the assertion of the test constructors. Regardless of the validity of this traditional test specification technology, it gives little guidance to the process of specifying measurement intents for extended assessment tasks." (Wiley & Haertel, 1996).

So, there has been some explication of assessment design issues and principals published. In particular, Grant Wiggins, for example, because of his interest in more complex tasks and new assessment purposes (see references below), has explored the design of educational assessments in some detail. However, most of this analysis, as with that of others, is presented as conceptual discussion and/or general guidelines that can be used to develop improved assessments (see Wiggins & McTighe 1998; Wiggins, 1998). The result constitutes advice as opposed to an assessment design object model embedded in a systematized, replicable, tool-based process.

3. New Art

As described above, prior art with respect to assessment design presents many problems to practitioners—both conceptual and pragmatic. Conceptually speaking, most prior art focuses on only part of an assessment's design—either what we want to measure or the tasks we want to use—as opposed to creating a coherent argument that flows from not only what we want to measure, but what we want to claim about that, to what evidence is required to support those claims, to the tasks, with their features and environments, that will provide that evidence. This traditional conceptual framework is inadequate to the practice of meaningful assessment design because it lacks the following pieces of an assessment's validity argument:

Claims: claims are the means of developing a construct-based inferential model for the assessment that is relevant to purpose of the assessment; claims guide the way to meaningful evidence design. The use of claims as a starting point in assessment design addresses the component of test validity that calls for the consequences of test use, or purpose, to be taken into account (Messick, 1994).

Evidence: the specific features of student work or behavior, the observation of which constitutes evidence for a claim; evidence is the piece of the conceptual bridge needed because, for any claim, it defines what the pattern of behavior or work characteristics needs to be, and therefore, guides the way to relevant task design.

In addition to these larger chunks, the conceptual framework related to prior art lacks a rigorously defined assessment design object model. Therefore, reasoning through the design of an assessment is difficult, if not impossible.

Finally, existing conceptual frameworks tend to blur the line between design and implementation of an assessment. The idea that a design based on substance is a distinct entity and precursor to quantified specifications is absent: task design is conflated with authoring; inferences relevant to an assessment are conflated with measurement models.

Pragmatically speaking, prior art primarily provides tools for implementation rather than design of assessments: task authoring tools, including automatic item generators; tools for the development of measurement models. Where design tools are available, they tend to be task-centered, tend to use physical rather than substantive models, and/or are disembodied from other components of assessment design.

We have argued for an evidence-center approach to assessment design in many places (see references). However, this new art goes many levels beyond argument, advice, lore, or guidelines related to the design of educational assessments. The Portal Assessment Design System provides complete and systematic support for use of a comprehensive evidence-centered conceptual framework from which a coherent validity argument in the form of assessment design specifications can be developed in an iterative manner for any kind of educational assessment. It does this by embedding a full evidence-centered assessment design object model in a computer-based tool system. The properties of the design objects themselves in combination with the functionality provided by the tool system provide a powerful vehicle for reasoning through the design of an assessment from an evidence-centered perspective. The assessment design process represented by this system supports development of a full assessment design, from the substantive specifications through the quantitative specifications needed for implementation. It accomplishes this by staging the design process into distinct/discrete, albeit inter-related, phases, each with its own collection of design objects which undergo principled transformation from phase to phase. The final specifications provide detailed guidance for implementation of all delivery processes, data structures and materials for a given assessment. Finally, the Portal Assessment Design Tool System makes assessment design on a large scale possible by providing the database and database management capabilities required for achieving wide-spread shared use of the assessment design object model and re-use of specific assessment designs.

SUMMARY OF THE INVENTION

The Portal Assessment Design System embodies a suite of software tools that manages and facilitates the creation, maintenance, reuse, distribution and storage of the entire collection of evidence-centered designs and design objects using a standardized design database. The tools in combination with the database constitute a powerful capability for capturing, organizing and storing assessment design information.

The Portal Assessment Design System was developed to meet two kinds of challenges in the domain of assessment design: those related to the validity of assessment and those related to the efficiency of assessment development.

1. Validity

Increasingly, assessment has many intended uses; an assessment must be designed to be consistent with its intended use. Assessment needs to be able to capitalize on the more complex data available from more complex and/or technologically sophisticated assessment tasks; however, unless the data coming from such tasks can be understood as legitimate evidence of what we wish to infer or claim about individuals who engage in the assessment, the assessment's validity is compromised. Assessment needs to be fair, equitable and accessible; therefore, features of assessment tasks and conditions must be understood in terms of their impact on evidence gathered from assessment. The purpose of the Portal Assessment Design System is to meet these challenges by a) providing direct support to assessment developers' use of an evidence-centered conceptual framework for designing assessments;

b) providing direct support to assessment developers' use of an evidence-centered object model (collection of design elements, or objects) for designing assessments.

2. Efficiency

The activity of assessment design entails large demands for the gathering, organization and storage of data. To assure production of high-quality new assessment products and product families in numbers sufficient to meet burgeoning assessment demand, assessment development must be efficient and cost-effective; in addition, maintenance of on-going operational assessments requires efficiency in both generation of large numbers of items and developing items for particular levels of difficulty. The purpose of the Portal Assessment Design System is to meet these challenges by a) providing a collection of software tools that facilitate the creation of standardized assessment designs and their constituent elements;

b) providing a design repository, or database, capability for sharing and reusing standardized assessment designs and design objects.

The Portal Assessment Design System embodies the conceptual framework, or principles, constituting an evidence-centered approach to the problem of assessment design. The evidence-centered conceptual framework organizes reasoning through the assessment design process to progress in a coherent and connected way from the intended purpose of an assessment, through the kinds of things we'd like to be able to say about students, what evidence we need to collect to support those claims, how to design tasks to elicit the required evidence, how to score these tasks, and finally to how to build the appropriate psychometric models. The evidence-centered conceptual framework facilitates the development of a construct validity argument for a particular assessment's tasks and scoring schemes that can be rationalized in terms of explicitly defined evidence.

The Portal Assessment Design System embodies the object model used to express this evidence-centered conceptual framework and explicate the validity argument. The object model organizes information encompassing all phases of the evidence-centered assessment design process—from beginning data collection for assessment product requirements to final specifications for task creation, statistical modeling and assessment delivery. As a result, the object model consists of a large array of design objects, each with properties appropriate to both a specific kind of assessment design information and a particular phase of the assessment design process. Therefore, the complexity and specificity of the design objects in this object model vary from ones with a few simple descriptive properties used in the beginning phase of assessment design to ones with multiple inter-related quantitative properties used in the last phase of the evidence-centered design process. The explicit relationships among the design objects in the object model, as well as their distinct properties, provide structure for the evidence-centered assessment design process.

BRIEF DESCRIPTION OF THE DRAWINGS

The present invention is illustrated by way of example and not limitation in the accompanying figures in which like numeral references refer to like elements, and wherein:

FIG. 10 illustrates an exemplary GUI form for entering descriptors of performance outcomes/behaviors;

FIG. 20 illustrates an exemplary GUI form for entering the student model variable with its states;

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

The conceptual framework, which helps users organize reasoning through an evidence-centered design process, is realized in the Portal Assessment Design System through a) the system's separation into discrete design modules; b) the manner in which the evidence-centered object model is distributed across these design modules; c) information available through Help (glossary and conceptual work process). The Portal Assessment Design System allows a user to generate assessments through the evidence-centered design process.

Figure 1:
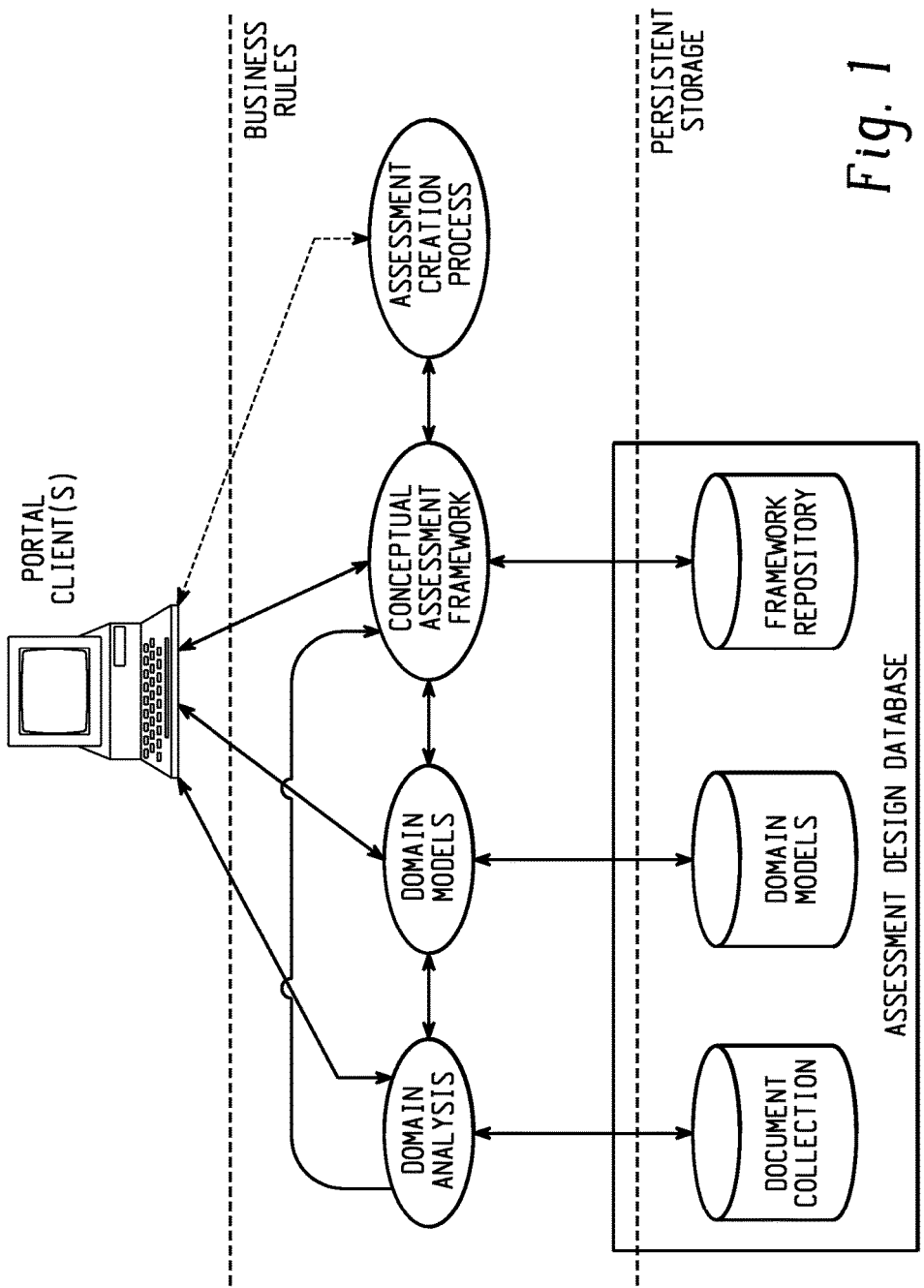
FIG. 1 illustrates a block diagram of a Portal Assessment Design System.

FIG. 1 illustrates an exemplary three-tiered client-server architecture which may be employed for implementing the Portal Assessment Design System. An assessment design may be generated on a Portal client using the business rules tier and the persistent storage tier.

The business rules tier includes three modules each of which targets a specific phase of the design process: Domain Analysis, Domain Modeling, Conceptual Assessment Framework. Each module has its own set of objects for organizing information which require increasingly explicit answers to the questions: what are the knowledge skills and abilities of interest, what is evidence of these, how can situations be structured to elicit this evidence. Objects include building blocks of information which are structured, organized, etc., based on the requirements set forth in each model.

In Portal, the basic unit of organization is the project. The creation of a Portal project (a function available in any of Portal's design modules) results in the initialization of a Portal design database and a folder for storing electronic files in a user-defined path. This same data base is then available in the other Portal design modules as the collections of design objects are developed. The sequence of modules represents the structure of a design process that helps assessment developers work through successive stages or phases of assessment design, from the gathering of raw information to the creation of a complete set of specifications for an assessment product.

The Domain Analysis module: Facilitates-gathering information related to subject matter and product requirements for developing one or more assessments. Document and trifle design objects are used to gather information related to subject matter and product requirements for one or more assessments. The Domain Analysis module is connected to an assessment design database, which stores the objects for this module. The Domain Modeling module: For sketching descriptive models of components of one or more assessments. These descriptive models should express the substantive assessment argument. The Domain Modeling module uses paradigm, aspect and protorule design objects to sketch descriptive models of components of one or more assessments. The Domain Modeling module is connected to the assessment design database, which stores the objects for this module.

The Conceptual Assessment Framework (CAF) module: For full (quantitative as well as descriptive) specification of a complete set of models for operational components of a particular assessment. The Conceptual Assessment Framework (CAF) module includes model, variable, rule, and material specification design objects to produce a full set of specifications (quantitative as well as substantive) for a complete set of components to be implemented as a particular assessment. The Conceptual Assessment Framework (CAF) module is connected to the assessment design database, which stores the objects for this module A specification created by the three modules may be used by an assessment creation process, which is outside the Portal Assessment Design System. The assessment creation process can utilize models constructed with the Portal Assessment Design System of the present invention to generate an assessment.

Figure 2:
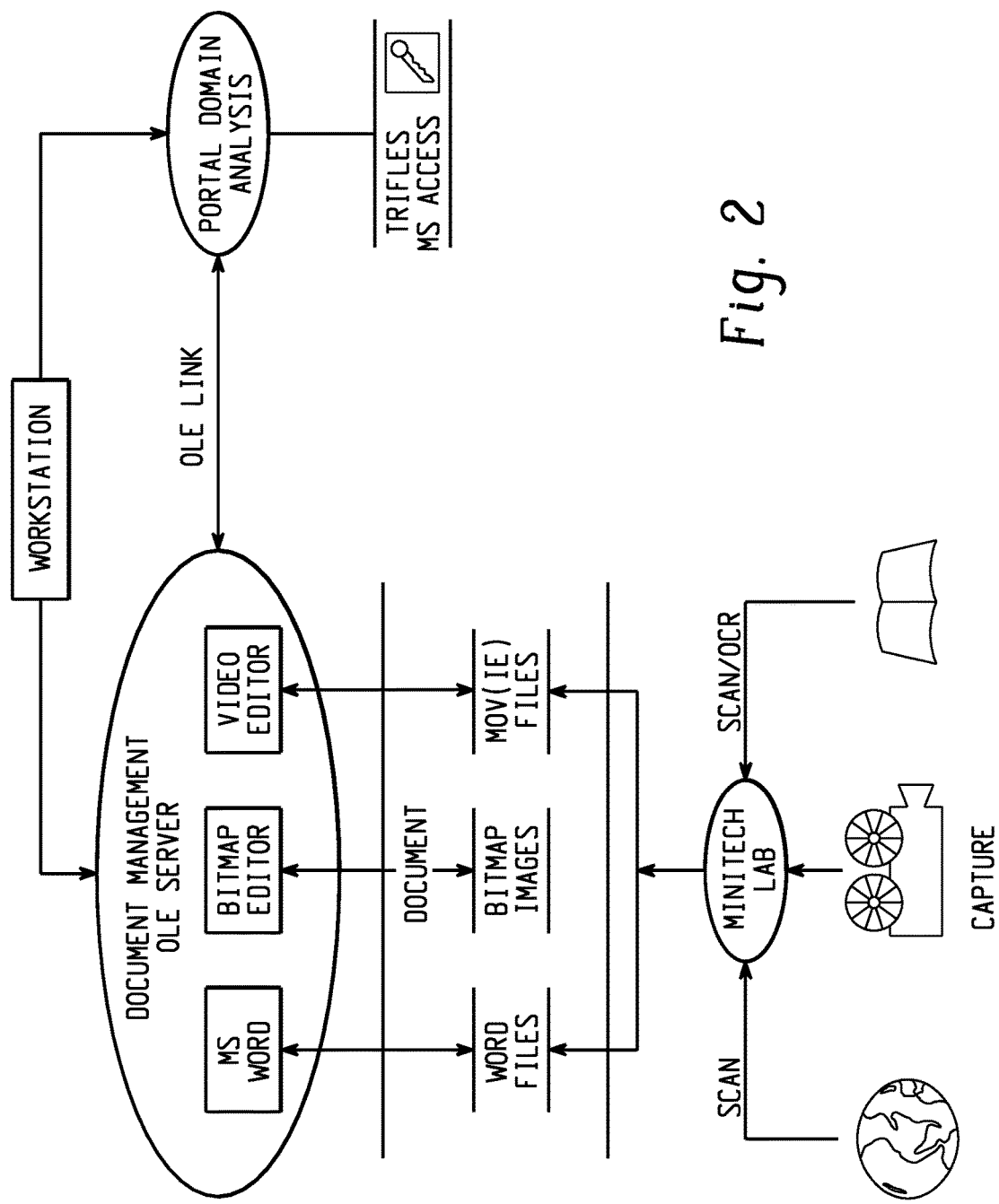
FIG. 2 illustrates a block diagram of a Domain Analysis module.

FIG. 2 illustrates a block diagram of the Domain Analysis module shown in FIG. 1. The Domain Analysis module may be connected to a document management server for gathering information in a database, such as the assessment design database. The information may include images, text, references to hard copies of information, and the like.

The Domain Analysis module utilizes trifles to structure the data gathering process. Trifles are used to structure the initial phase of assessment design, that is the survey of the subject matter domain and the various possibilities and requirements for assessment. However, the purpose of trifles is not only to describe predefined varieties of assessment design information, but also to bookmark, or link, the piece of information to the document which is its source. Therefore trifles provide both a structure for the pieces of information that are gathered from the document collection and also, once created, provide automated bookmarking to the original source of the information. As users employ trifles to structure their data gathering, they become aware of deficits in their information. This causes them to seek new sources of information in an iterative manner from which they can obtain the needed kinds of information.

Figure 3:
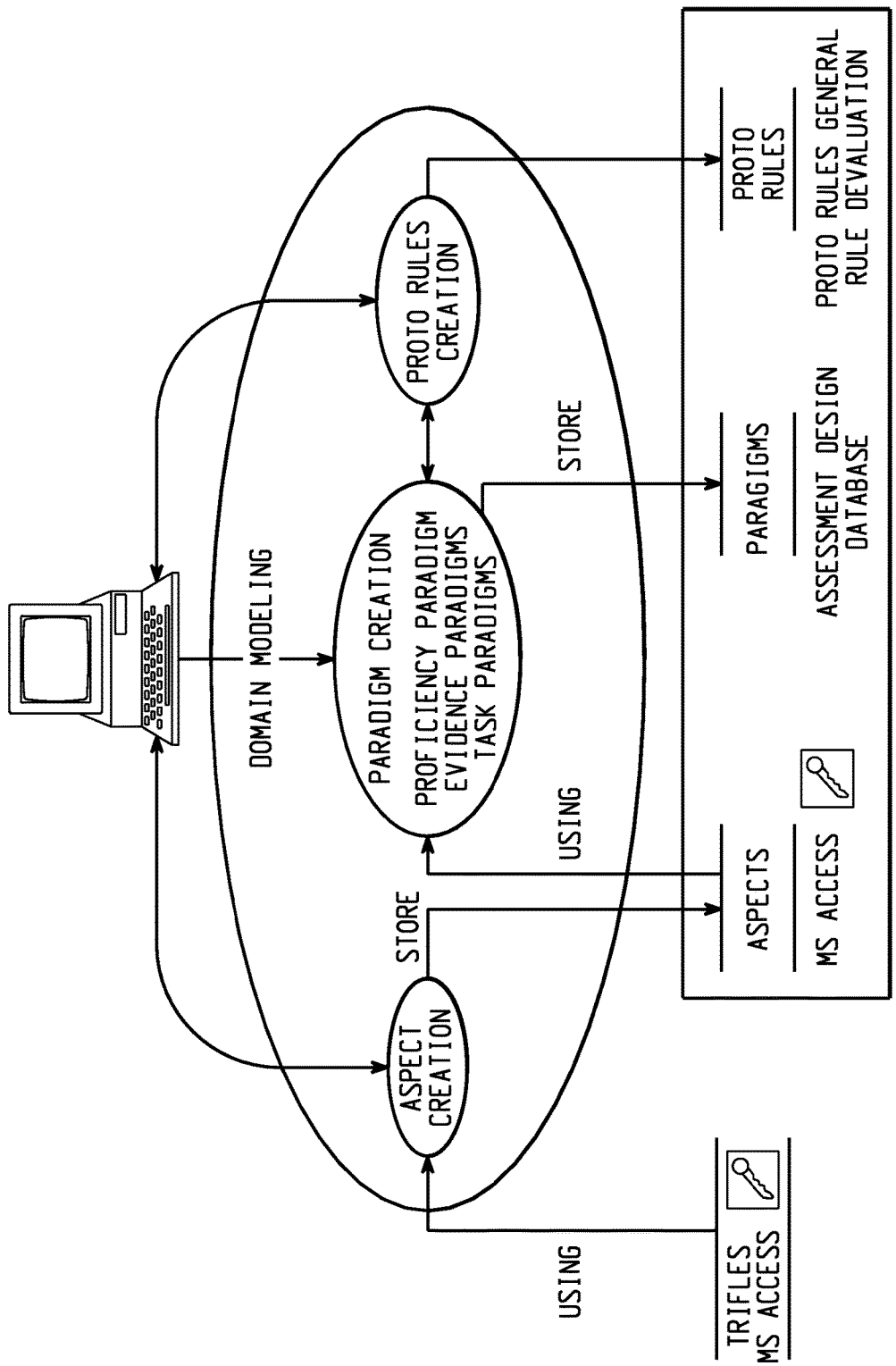
FIG. 3 illustrates a block diagram of a Domain Modeling module.

FIG. 3 illustrates a block diagram of the Domain Modeling module shown in FIG. 1. The Domain Modeling module includes aspects, paradigms and protorules. The Portal system's Domain Modeling module is intended to enable assessment designers to carry out the process of organizing pieces of different kinds of information into working models of proficiency (knowledge, skill, or ability targeted by the assessment), evidence (patterns of behavior that impact estimates of proficiency), and tasks (how such evidence can be elicited). Design activities carried out in Domain Modeling use the trifles created in Domain Analysis and result in the creation and maintenance of an aspect collection, a paradigm collection, and a proto rule collection which are stored in the project data base.

Figure 4:
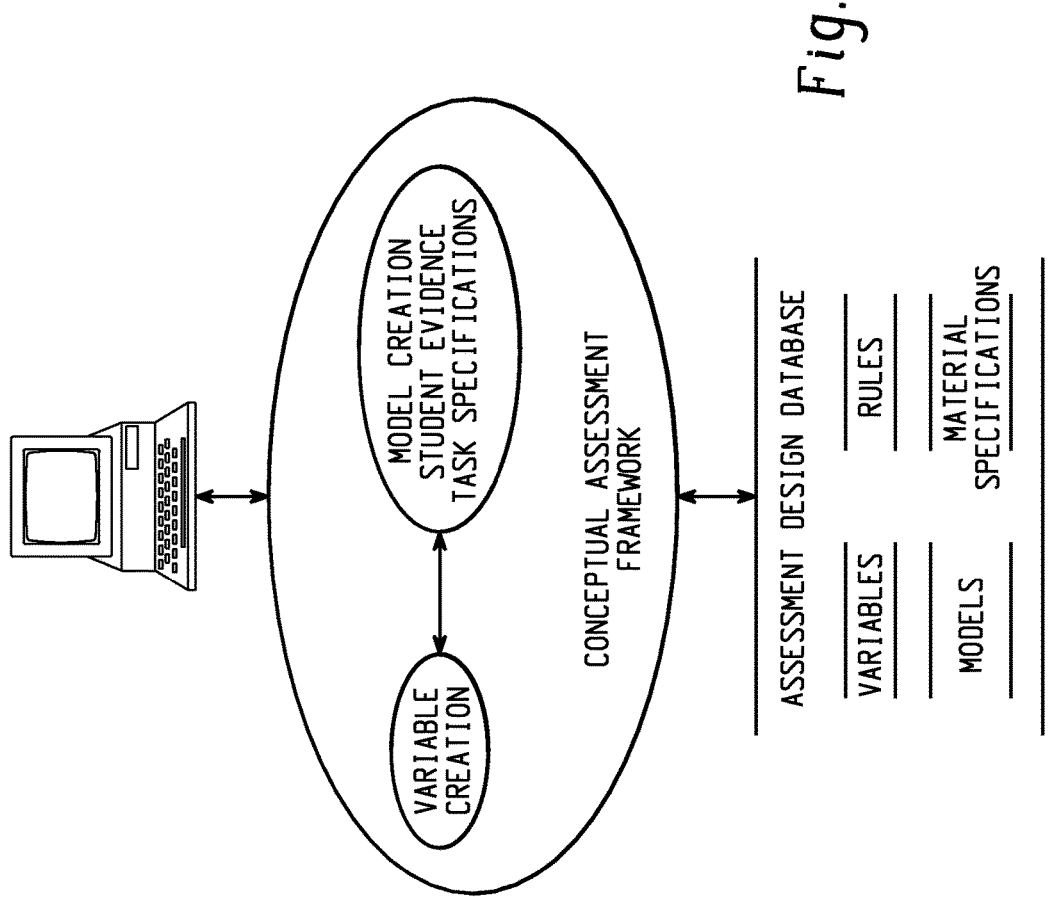
FIG. 4 illustrates a block diagram of a Conceptual Assessment Framework module.

FIG. 4 illustrates a block diagram of the CAF module shown in FIG. 1. The purpose of the CAF is to produce fully specified models which can be implemented as the operational processes required to deliver an assessment: presentation, evidence identification (response scoring), evidence accumulation (summary scoring), and activity selection (task selection and sequencing). Design activities in the CAF use the aspect, paradigm, and proto rule collections created in Domain Modeling as the basis for development of 1) statistical models of proficiencies whose substance was modeled in proficiency paradigms, 2) statistical models of evidence whose substance was modeled in evidence paradigms, and 3) more complete specification of tasks modeled in task paradigms. In order to do this, the CAF is the place where all the considerations relevant to a specific implementation of an assessment are taken into account. Design activities in the CAF result in the creation and maintenance of a variable collection, a model collection, a materials collection, and a rule collection which are stored in the assessment design project database.

The Portal Assessment Design System embodies a suite of software tools that manages and facilitates the creation, maintenance, reuse, distribution and storage of the entire collection of evidence-centered designs and design objects using a standardized design database. The tools in combination with the database constitute a powerful capability for capturing, organizing and storing assessment design information for use in creating assessments.

Management of the evidence-centered design object model is achieved through computer-based tools that allow the user to create, edit, store/retrieve, report on and search for assessment design objects. The tools are realized as menu and button functionality in the GUI for each design module and its associated set of design object forms. This functionality is implemented as a collection of methods associated with each class of design object in the object model, which, all together, constitute a powerful means for managing the design object model and enabling its storage and access via a standardized data base. The Portal Assessment Design System allows for import and export of its design data bases.

The next sections describe how to use the Portal Assessment Design System to solve the following assessment design problems: assessment for a non-traditional purpose using more complex data available from more complex and/or technologically sophisticated assessment tasks; addressing fairness/equity/accessibility for special populations; targeted item generation.

In these following sections, we will walk through how to design a new (biology) assessment using the Portal Assessment Design System. Then, using the assessment we have just designed, we will describe how the Portal Assessment Design System is used to address other design problems: issues associated with fairness/equity for special populations; generating assessment tasks targeted at particular levels of difficulty; and developing product spin-offs. The Portal Assessment Design System may provide a GUI interface that allows users to enter and edit information. Some examples of GUI interfaces are illustrated in the figures and described below.

Portal in General

As stated above, the Portal Assessment Design System has three design modules: Domain Analysis, Domain Modeling, Conceptual Assessment Framework. Each level has its own set of objects for organizing information which require increasingly explicit answers to the questions: what are the knowledge skills and abilities of interest, what is evidence of these, how can situations be structured to elicit this evidence? In Portal, the basic unit of organization is the project. The creation of a Portal project (a function available in any of Portal's design modules) results in the initialization of a Portal design data base and a folder for storing electronic files in a user-defined path. This same data base is then available in the other Portal design-modules as the collections of design objects are developed.

Domain Analysis

The first activities in designing any new assessment are focused on gathering information about the subject matter (e.g., biology, American history, etc) and non-subject matter (e.g., purpose, cost, legal, etc) requirements for an assessment. This information comes in many forms from many different sources: text books, research reports, letters, government publications, technical specifications. The task of gathering, organizing and storing this information in a way that it is both easily retrievable and sharable by all those involved in designing the new assessment is large and complex.

Design activities carried out in Domain Analysis result in the creation and maintenance of a document collection and a trifle collection which are stored in the project data base.

The Document Collection

The Domain Analysis module of the Portal system allows this material to be collected and organized into a document collection, where a document is defined logically to include all its physical pieces, whether machine-readable or not and regardless of file type. For example, a research report in machine-readable form may actually include both text and graphics files, but is considered to be one logical unit.

The Portal system provides two different kinds of document forms to users: one to describe documents containing information related to the subject matter domain (domain document) and another to describe documents containing information related to non subject-matter requirements (requirements document). Each type of document form allows the user to describe the specific properties of either a domain or a requirements document; this includes a list of the related physical files constituting the document (known as document sections). Addition of document sections to a document is accomplished via file explorer capability and results in the user being able to open the electronic files associated with a document directly from within that document. Documents in machine readable form must have their files placed in a documents folder associated with the assessment design project. Domain and requirements documents that are not in machine-readable form may also be part of the document collection; they are known as reference documents.

Figure 5:
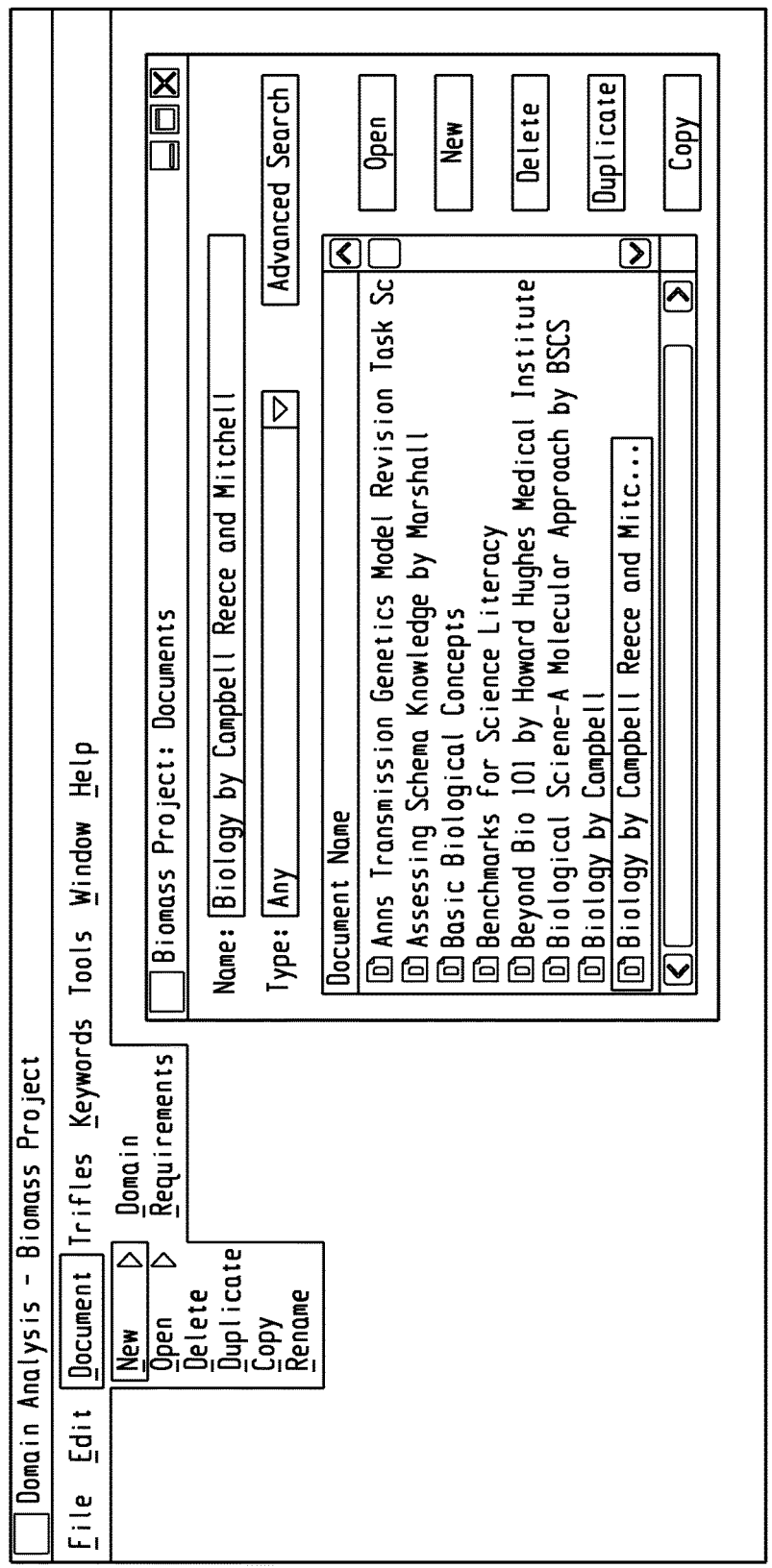
FIG. 5 illustrates an exemplary GUI form for managing documents.

Users manage their document collection through the document management form (FIG. 5) which, in addition to the functionality supplied via the menu bar, helps users create, edit, and retrieve documents.

The Trifle Collection

As stated above, documents are gathered as the foundational material of assessment design because they contain information essential answering questions essential to the design of assessment. The nature of this information is constant across assessments regardless of purpose or subject matter domain. The various kinds of trifles are a categorical representation of this information and addresses the following questions:

What knowledge is valued within a particular subject matter domain? (valued knowledge trifle)

What work or activities are valued within a particular subject matter domain? (valued work trifle)

What representations do experts within this domain use to capture and communicate knowledge? (valued representation trifle)

How is knowledge structured within the domain? (knowledge structure & relationship trifle)

What is the relationship between knowledge and tasks in the domain? (knowledge/task relation trifle)

What are patterns of behavior that distinguish different levels of proficiency within a domain? (performance outcome trifle)

What are important features of task situations in this domain? (task feature trifle)

What are the characteristics of existing assessments in this domain? (operational trifles)

What are the non subject matter requirements for new assessments in this domain? (requirement trifle)

These questions are the target of design activities throughout all phases of assessment design.

To help users answer these questions from the materials that have been gathered, the Portal system provides a trifling, or note-taking, capability. There are three overall categories of trifles:

Analytic, or those appropriate for describing the subject matter domain;

Operational, or those appropriate for describing characteristics of existing assessments; and Requirement, or those appropriate for describing non subject matter assessment requirements.

Each category of trifles contains one or more different trifles, each specialized to help the user gather specific kinds of information. There are seven different analytic trifles, each with somewhat different properties: valued knowledge, valued work, valued representation, performance outcomes, task feature, knowledge structure and relationship, knowledge task relation. There are three different operational trifles, each with somewhat different properties: exemplar of test specs, exemplar of performance, source of stat info. There is only one kind of requirement trifle.

Trifles are used to structure the initial phase of assessment design, that is the survey of the subject matter domain and the various possibilities and requirements for assessment. However, the purpose of trifles is not only to describe predefined varieties of assessment design information, but also to bookmark, or link, the piece of information to the document which is its source. Therefore trifles provide both a structure for the pieces of information that are gathered from the document collection and also, once created, provide automated bookmarking to the original source of the information.

Figure 6:
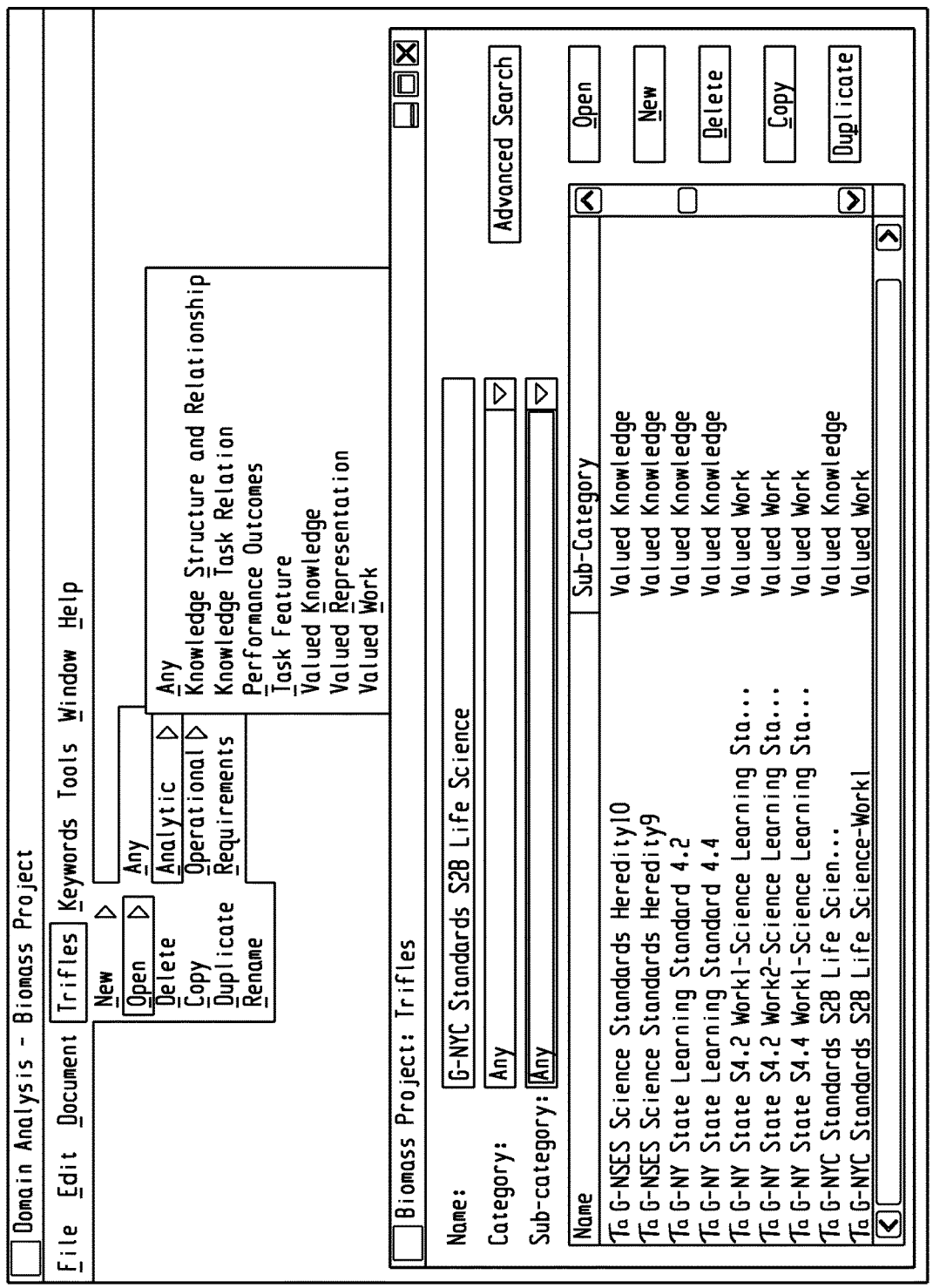
FIG. 6 illustrates an exemplary GUI form for trifle management.

GUI forms may be used to generate different kinds of trifles, such as valued knowledge, valued work, performance outcome, valued representation, task feature, knowledge structure and relationship and knowledge task relationship. Users may manage their trifle collection through a trifle management form (FIG. 6) which, in addition to the functionality supplied via the menu bar, helps users create, edit, and retrieve trifles.

As users employ trifles to structure their data gathering, they become aware of deficits in their information. This causes them to seek new sources of information in an iterative manner from which they can obtain the needed kinds of information.

Doing Design in Domain Analysis

Using the Portal system, design of a new assessment proceeds during the Domain Analysis phase as follows:

Assessment-related material gathered would be have any electronic files associated with it moved into the project's documents folder. For any given material, a document would then be entered into Portal's document collection as either a domain document or a requirements, with its descriptive properties including its sections (electronic files). (Non-electronic material is handled with the designation of 'Reference'.) For example, documents relating to biology standards would be entered as domain documents, while documents related to the client's need for diagnostic reporting would be entered as requirements documents.

As designers read through documents in the document collection they would choose to make trifles (notes) about particular kinds of information contained therein. For example, a document describing biology standards contains many pieces of information about what is important for biology students to know and be able to do. Once this document was added to the document collection, it could be 'trifled' into valued knowledge and valued work trifles, each containing notes which would be bookmarked to the related part of the standards document. Once the bookmark was established, the related trifles, which can be searched using a keyword capability, would provide an automated 'path' back to the relevant document. In the process of going through other documents in the collection, information about patterns of behavior or misconceptions of students at different levels of proficiency in biology would be captured in performance outcomes trifles; the structure of a high school biology curriculum would be captured in knowledge structure and relationship trifles; what knowledge is involved in the performance of important kinds of work would be captured as knowledge task relation trifles; the representations used to capture and communicate knowledge would be captured as valued representations; work products created in existing assessment(s) would be captured as exemplar of performance trifles; psychometric performance of existing assessment(s) would be captured as source of stat info trifles; assembly of existing assessment(s) would be captured as exemplar of test spec trifles. Requirements are used to describe constraints on things like time, cost, and other conditions of administration. An especially important use of requirements trifles is to capture reporting requirements describing who will be engaged with the assessment for what purposes and who will use assessment information and for what purposes.

Domain Modeling

As information about a new assessment is gathered, described and classified in Domain Analysis, it can be used in the next phase of assessment design. The Portal system's Domain Modeling module is intended to enable assessment designers to carry out the process of organizing pieces of different kinds of information into working models of proficiency (knowledge, skill, or ability targeted by the assessment), evidence patterns of behavior that impact estimates of proficiency), and tasks (how such evidence can be elicited). Design activities carried out in Domain Modeling result in the creation and maintenance of an aspect collection, a paradigm collection, and a proto rule collection which are stored in the project data base.

There are five kinds of aspects, which are used in different combinations to build four different paradigms; two other kinds of paradigms are build from different combinations of these four paradigms. There are three kinds of proto rules.

The Portal system provides a conceptual and physical bridge between Domain Analysis and Domain Modeling by facilitating use of trifles for creating aspects via a promotion function: different kinds of trifles map logically to specific kinds of aspects. The aspects and paradigms created in Domain Modeling can also be traced back to Domain Analysis via a pedigree function, which allows linkage of any aspect or paradigm to one or more trifles (which, in turn have been bookmarked to their source documents). In this manner, a trail is established that runs from the original sources of information for the assessment through the design objects created at different design phases.

The Aspect Collection

There are five kinds of aspects: Claims, aspects of proficiency, knowledge representations, descriptors of performance situations, descriptors of performance outcomes/behaviors. Aspects are derived from trifles and are used as building blocks for paradigms.

Aspects of proficiency are the kinds of student knowledge, skill or ability important to measure in the subject matter domain. They are derived from valued knowledge or valued work trifles.

Claims are the proficiency-related statements we would like to make about students who participate in the assessment. Claims, therefore, represent the specific inferences we want to make in an assessment about a student's knowledge, skill or ability. In general, they represent how interpretations of knowledge, skill and ability will be operationalized for a particular assessment product/purpose. They can be thought of as interpretations of states of individual aspects of proficiency, or interpretations that can be made as a result of some combining states of multiple aspects of proficiency. Most frequently they are derived from valued knowledge, valued work or performance situation trifles.

Knowledge representations are used to describe how knowledge is communicated among practitioners in the domain. They are derived from valued representation trifles.

Descriptors of performance situations describe features of performance situations or tasks. They are derived from performance feature trifles.

Descriptors of performance outcomes/behaviors are used to describe the essential features of student work or behavior that can be used as evidence for some aspect of proficiency. They are derived from performance outcome trifles.

Multiple GUI forms may be used for entering information for different types of aspects. Users may manage their aspect collection through the aspect management form which, in addition to the functionality supplied via the menu bar, helps users create, edit, and retrieve aspects.

The Paradigm Collection

There are six kinds of paradigms: proficiency, evidence, task, assembly, presentation, and delivery. Different aspects in different combinations are used to build proficiency, evidence, task, and assembly paradigms; presentation and delivery paradigms are built from different combinations of paradigms. Paradigms are used to organize pieces of related information into model-like data structures more appropriate for use with operational assessment processes.

Proficiency paradigms are descriptive models of what specific knowledge, skills and abilities we need to measure to fulfill a particular purpose. They are constructed from aspects of proficiency and claims. A proficiency paradigm also includes information about the relationships among the aspects of proficiencies it contains, the levels of proficiency within any given aspect and how different levels of proficiency in one or more aspects can be interpreted as a claim about the student who takes the assessment.

Evidence paradigms are descriptive models of how different kinds of evidence relate to the aspects of proficiency we want to measure. They are constructed from descriptors of performance outcomes/behaviors, aspects of proficiency, knowledge representations, and descriptors of performance situations. They also contain evaluation proto rules that describe how to evaluate student work to produce evidence, interpretation proto rules that describe how to interpret evidence, and parsing proto rules that describe how to process raw data produced by tasks to facilitate use by evaluation rules. Evidence paradigms link to proficiency paradigms and task paradigms.

Task paradigms describe features shared by task families, where a family is defined as a group of tasks having similar content and response requirements. Task paradigms are constructed from knowledge representations and descriptors of performance situations. Task paradigms link to evidence paradigms.

Assembly paradigms describe the collection of paradigms and the selection strategy(ies) that are needed to assemble a form, pool or vat of assessment tasks. They are constructed from claims, proficiency paradigms, evidence paradigms, and task paradigms.

Figure 7:
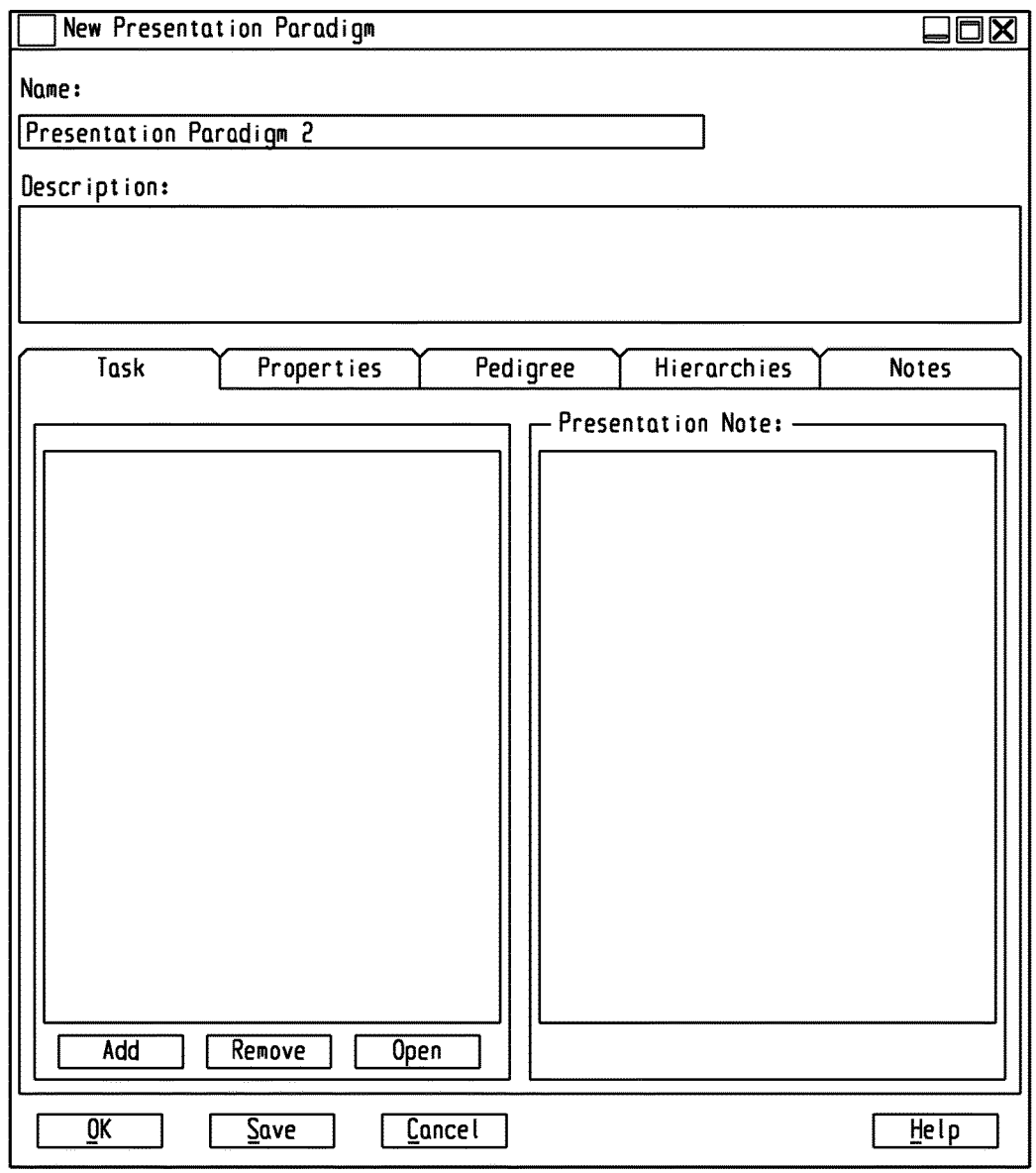
FIG. 7 illustrates an exemplary GUI form for entering a presentation paradigm.

Users manage their paradigm collection through the paradigm management form which, in addition to the functionality supplied via the menu bar, helps users create, edit, and retrieve paradigms. FIG. 7 illustrates a GUI form for entering a presentation paradigm.

The Proto Rule Collection

Figure 8:
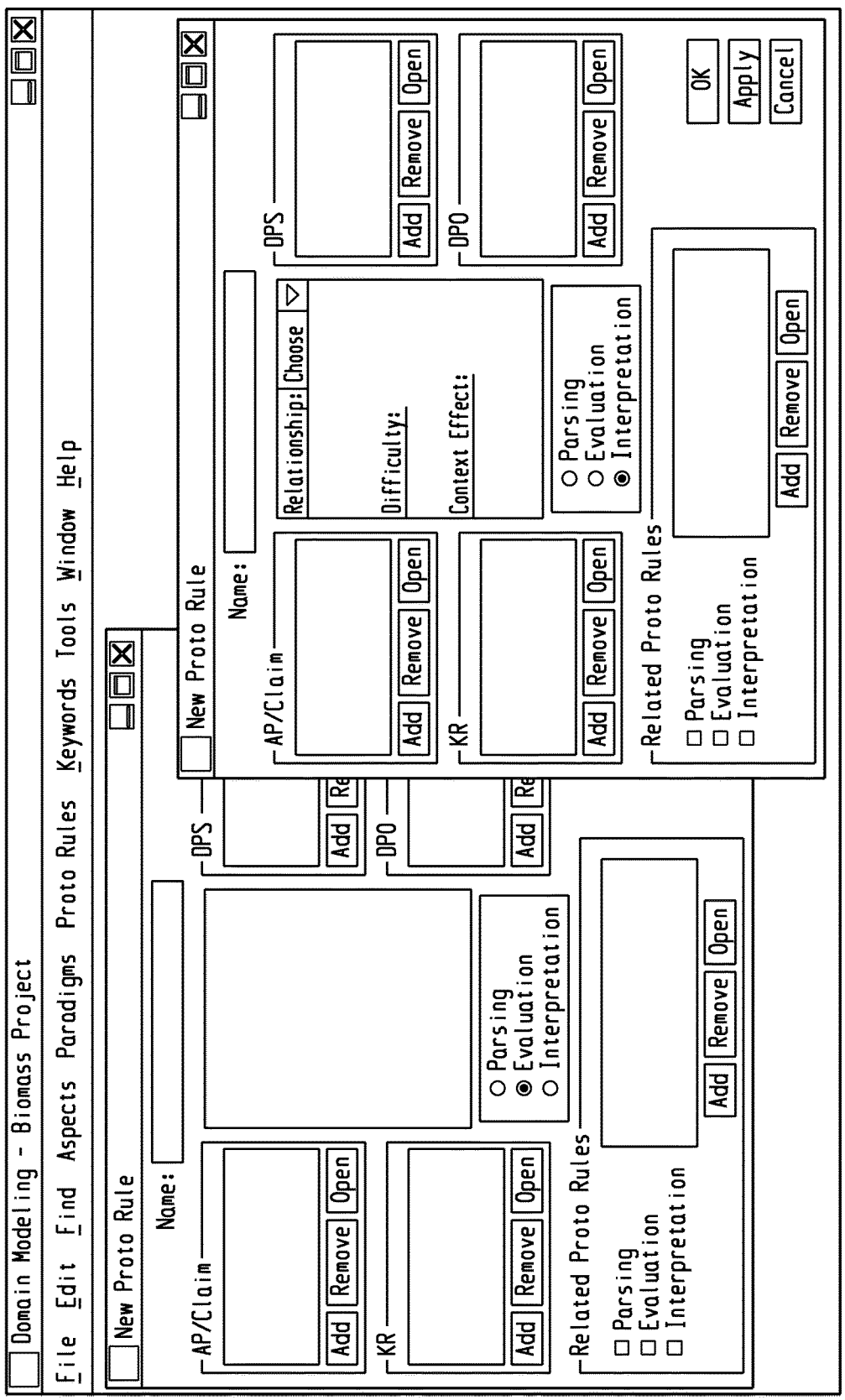
FIG. 8 illustrates an exemplary GUI form for entering proto rule information.

There are three kinds of proto rules: parsing rules, evaluation rules, and interpretation rules. Proto rules are contained in evidence paradigms. Parsing rules are used to process raw task response data to produce a knowledge representation for a linked evidence paradigm; evaluation rules process these knowledge representations to produce values for the evidence paradigm's descriptors of performance outcomes/behavior; interpretation rules describe relationships between descriptors of performance outcomes/behavior and aspects of proficiency in linked evidence and proficiency paradigms. FIG. 8 illustrates a GUI form for entering proto rule information.

Doing Design in Domain Modeling

The fundamental goal of creating these design objects in Domain Modeling is to create substantive models of proficiencies, evidence and tasks. This means we are trying to model as much substantive information related to the assessment's validity argument as possible. Paradigms therefore focus on qualitative, as opposed to quantitative, aspects of proficiencies, evidence and tasks: the nature of the evidentiary observations necessary to support claims, not the number of observations; the nature of tasks that can elicit such evidence as opposed to considerations related to their implementation (e.g., response type or mode of presentation); the structure of the relationship between what is observed and the related underlying proficiencies to be measured, not its statistical properties. Quantitative aspects of design models become relevant only when the focus is on a particular assessment product that fulfills a specific purpose and set of implementation and/or administrative constraints. In Domain Modeling, we are still focused on understanding the nature of the relationships among proficiencies, evidence and tasks and exploring possibilities absent these constraints. This understanding is necessary in order to optimize cost/benefit decision-making when satisfying constraints in later phases of design and implementation.

Using the Portal system, design of a new assessment proceeds during the Domain Modeling phase as follows:

As stated above, the Portal Assessment Design System provides support for refinement of design objects over multiple design phases, with each phase using objects created in the previous phase as the starting point for creating new and more refined design objects. We now have a collection of trifles to build on in continuing our design.

The first order of business is to focus on what we want to assess, that is, what aspects of knowledge, skill or ability are of interest to audiences for information from the assessment. We first create aspects of proficiency from valued knowledge and valued work trifles (using the promotion function). For example, a valued knowledge trifle such as transmission genetics and a valued work trifle such as scientific investigation would be promoted into aspects of proficiency (with descriptive properties).

The second order of business is to formulate the assessment's claims. These are statements, or specific inferences, we might want to be able to make about students with respect to the knowledge, skill and abilities being measured. Claims are formulated to address not only the aspects of proficiency of interest in the assessment, but also address the additional questions:

Who is going to be assessed and for what purpose(s)?

Who are the intended audiences for information coming from the assessment?

That is, claims define those inferences about a student's knowledge, skill or ability that are relevant to the purpose and potential intended uses of an assessment. It is important to keep in mind that at this point, in Domain Modeling, who is going to be assessed and who the intended audiences are for information from the assessment may be very broadly defined; that is, we have not narrowed our focus to a specific product. We are thinking about what aspects of proficiency, in general, would be of interest in an assessment that supported learning in high school biology; who, in general, would use this information; what, in general, would be the kinds of claims one would want to be able to make. Therefore, the universe of potential claims of interest one can define in Domain Modeling can be quite large. Claims are an amalgam of information we have collected in Domain Analysis, typically as requirements trifles related to reporting as well as valued work and valued knowledge trifles. So the first step in developing claims in Domain Modeling is to find the requirements trifles related to reporting, which determine the level of detail and audience focus of claims. (If we find that there are no trifles describing reporting requirements, then we need to go back to Domain Analysis and collect this information.) The next step is to review our trifles for valued knowledge and valued work, which determines the substance of the claims. Once we have identified a coherent collection of all these kinds of trifles, the next step is to integrate this information to create one or more claims. For example, here are the names of a coherent set of trifles we could use to formulate claims (in the tool system, this kind of structure is supported with hierarchy functions):

Valued Knowledge: transmission genetics, which includes

Valued Knowledge: mode of inheritance (Mendel's model)

Valued Knowledge: sexual life cycles

Valued Knowledge: meiosis

Valued Knowledge: mechanisms of evolution, which includes

Valued Knowledge: mutation

Valued Knowledge: natural selection

Valued Knowledge: genetic drift

Valued Work: scientific investigation

Valued Knowledge: model-based reasoning

Requirement (Assessment purpose): to support learning directly

Requirement (Assessment participant): high school biology students

Requirement (Audience for assessment information): teachers and students

Requirement (Intended use of assessment information): to focus classroom activities to improve mastery of material Here are some examples of resulting claims:

Claim: student can reason using all elements of Mendel's Model

Claim: students can use and revise models as part of conducting an investigation in transmission genetics Claim: students can use and revise models of natural selection as part of conducting an investigation in microevolution It should be emphasized that the tool system provides support for specific kinds of objects with specific properties for describing particular kinds of information; however, creating such information—whether through integration, decomposition or some other analytic process—is still an intellectually creative process.

After we have created a set of claims for an assessment, we turn to the question of structuring the knowledge, skill and ability important to measure in a way that more closely approximates a measurement model. The next step in the design is to represent this more formally as a proficiency paradigm. Our claims have given us a lot of information about the knowledge, skill and ability and the related level of detail that we want to report on.

Figure 9A:
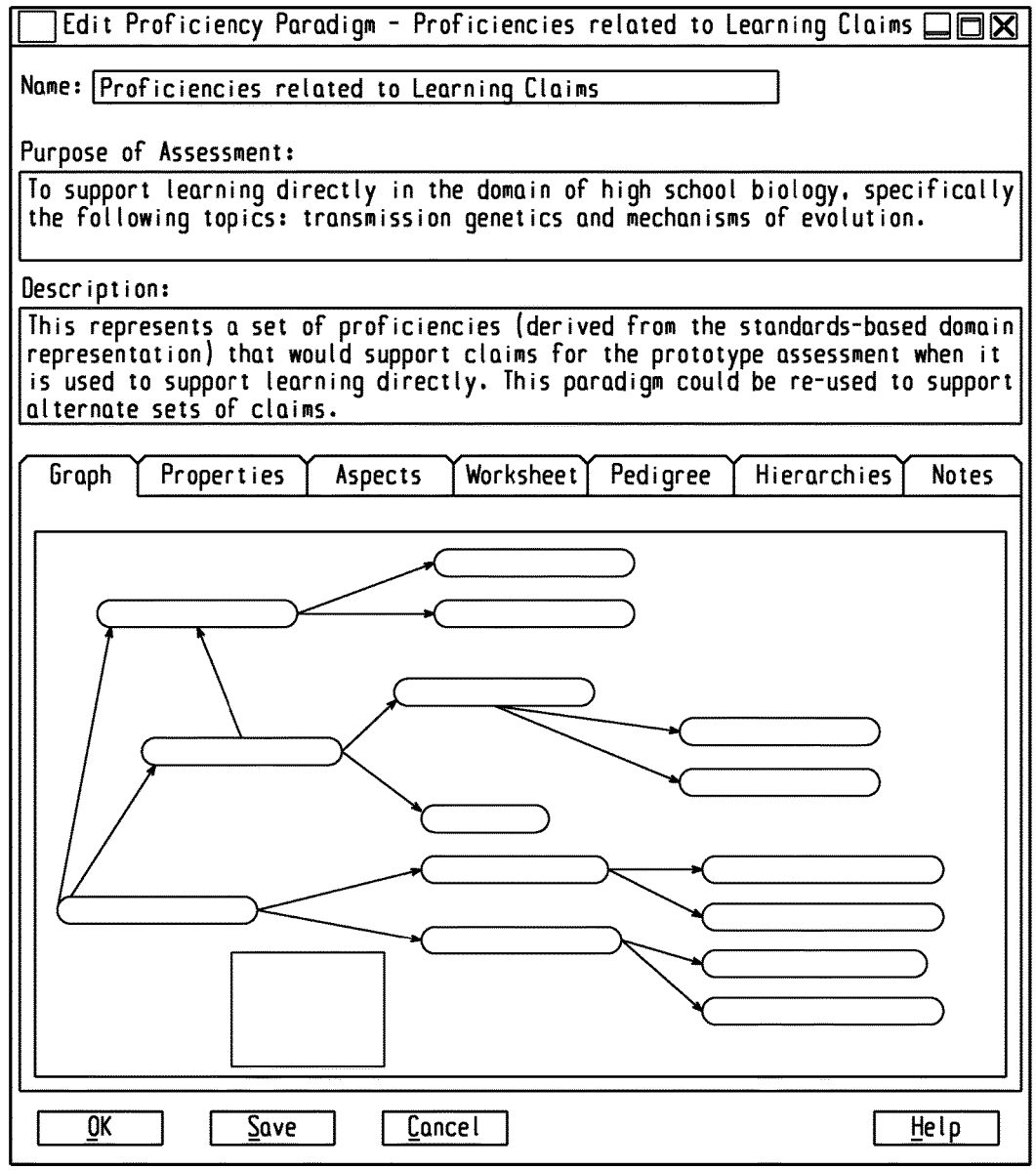
FIGS. 9A-C illustrate exemplary GUI forms for entering a proficiency paradigm.
Figure 9B:
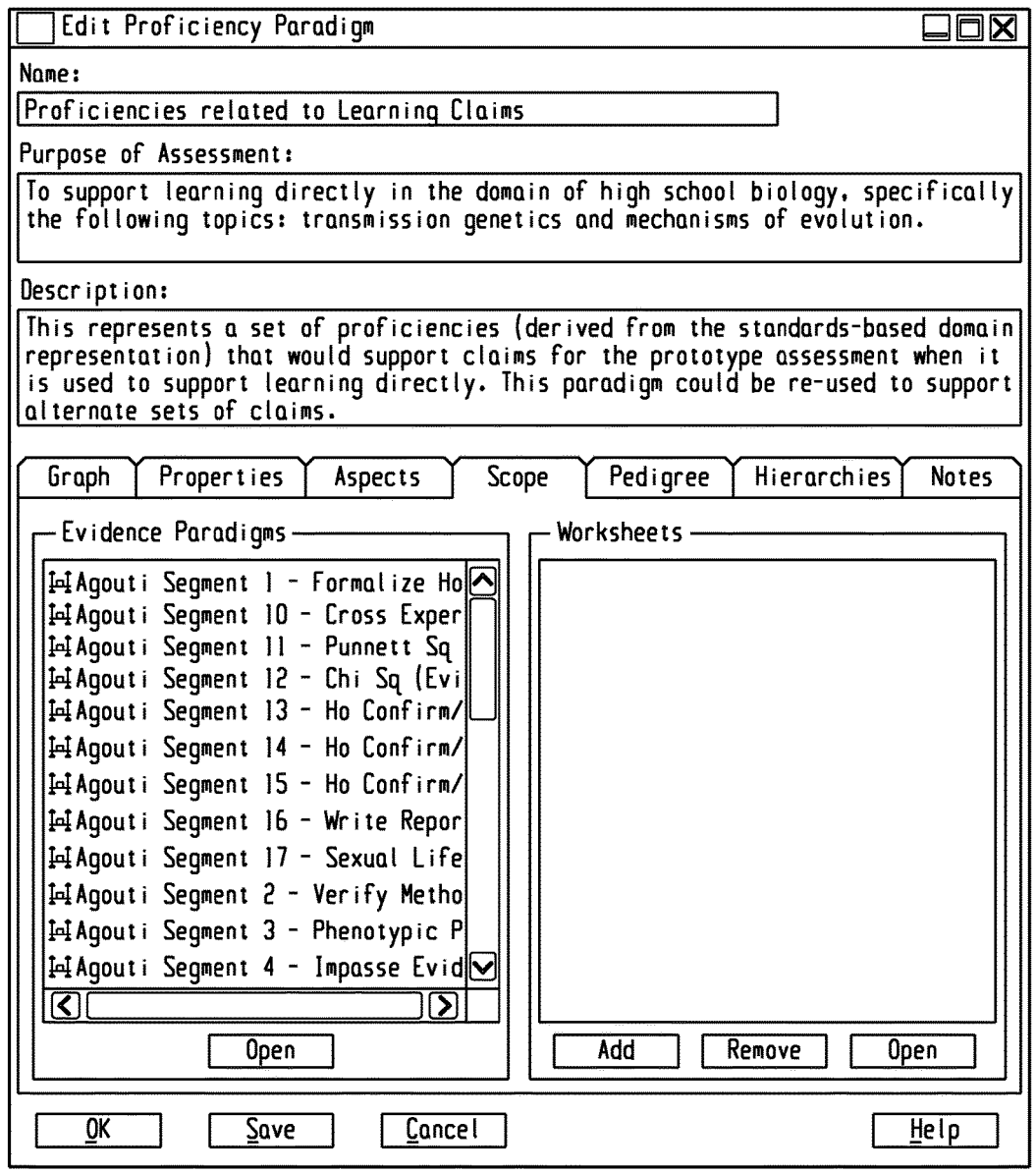
Figure 9C:
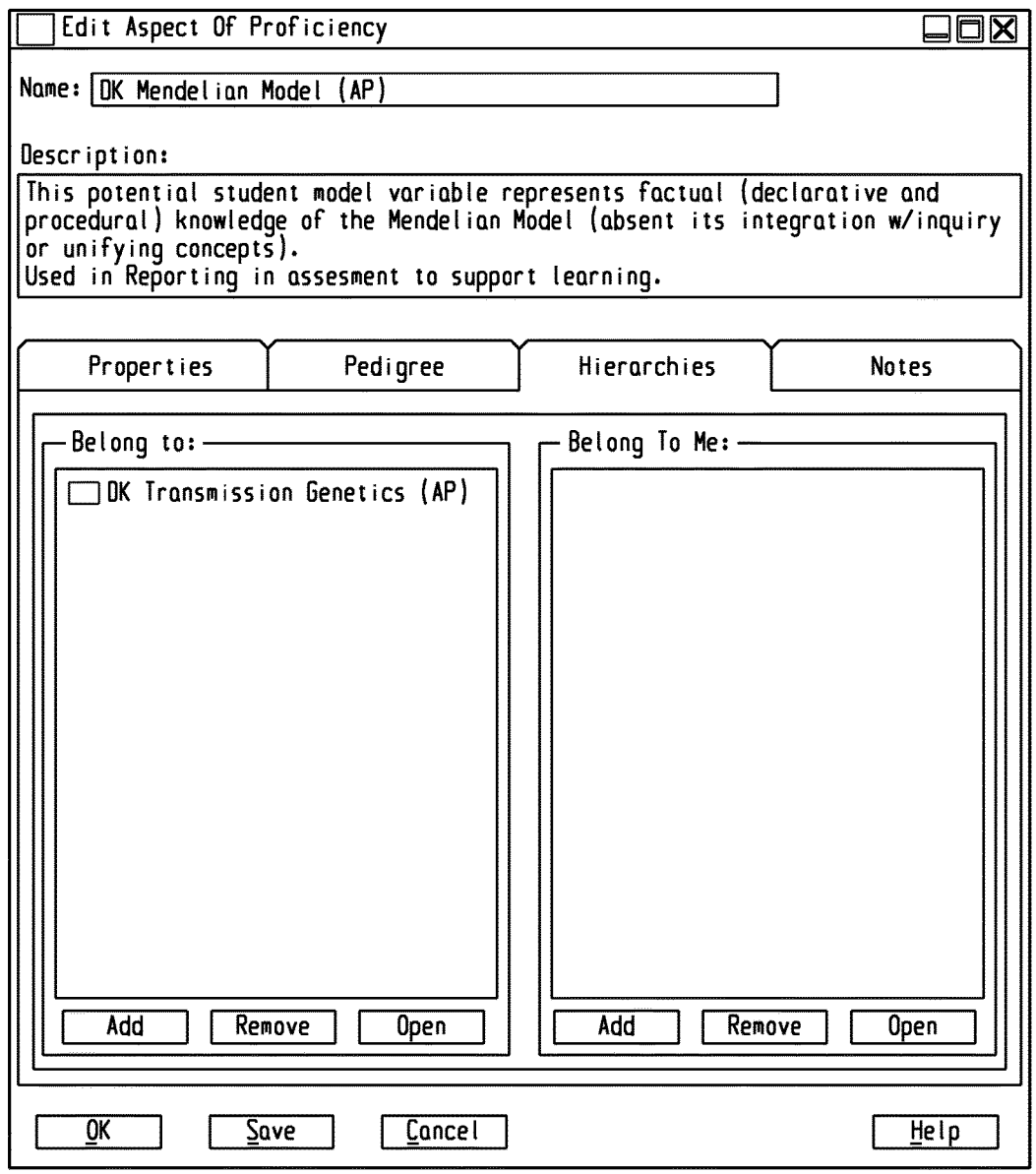

If we say that claims are statements we make about students who have participated in the assessment, they obviously have some relationship to what we want to measure. In fact, claims are statements that represent interpretations of students' state with respect to one of more aspects of knowledge, skill or ability. In building a proficiency paradigm, we use our claims as possible values (or states) of individual aspects of proficiency where appropriate; otherwise claims will be expressed later as reporting outcomes resulting from some combination of values from multiple aspects of proficiency. FIGS. 9A-C illustrate GUI forms for building a proficiency paradigm.

Because claims are statements that interpret student state on one or more aspects of proficiency, there is a direct relationship between claims and aspects of proficiency. A student achieves a particular state with respect to a particular aspect of proficiency as a result of the accumulation of evidence that bears on that aspect. How we accumulate evidence to support the claims we want to make is an important question that we first address by proposing relationships among aspects of proficiency. Structures that describe how aspects of proficiency relate to each other, or depend upon each other, enable us to begin to understand how evidence, or what we observe, depends either directly or indirectly on these proficiencies. For example, if one posits a relationship between reading and writing such that reading is prerequisite to writing, then direct evidence of writing actually also gives us indirect evidence of reading; in other words, evidence that bears on writing is confounded with evidence that bears on reading. In order to assure that we accumulate evidence in such a way that we can support our claims unambiguously, it is very important to capture various kinds of dependency relationships among aspects of proficiency. In Domain Modeling, once we have defined all the aspects of proficiency of interest to us, we use proficiency paradigms to model such relationships.

Because a proficiency paradigm is supposed to represent dependencies among knowledge, skill and ability in a subject matter domain, its structure comes from the knowledge structure and relationship trifles we have collected. There may be many views of knowledge structure in a domain depending on whether the perspective taken is cognitive, curricular or whatever. The structure used to guide the proficiency paradigm should be consistent with the purpose of an assessment. That is, if an assessment is supposed to track a student's progress through a course, curriculum claims and the structure of the proficiency paradigm must be consistent with that. If, on the other hand, an assessment is supposed to identify conceptual difficulties across course material then both claims and the structure of the proficiency paradigm need to be consistent with that.

Once the proficiency paradigm has been drafted, the next design task is to begin to formalize the evidentiary requirements that support the claims it represents. This is done by first using trifles to develop the-building blocks for evidence paradigms and then building the evidence paradigms themselves.

For each claim, we identify and describe the nature of student work that would constitute evidence for the claim. That is, what we would need to observe. We can use our performance outcome trifles to support this work and promote them into descriptors of performance outcomes/behaviors; each includes a range of possible values that might be produced as the result of evaluating student work. FIG. 10 illustrates GUI forms for editing descriptors of performance outcomes/behaviors.

Once defined, we can use these descriptors in two ways: first, they help us think about the actual work or performance a student would have to produce in order to make these kinds of observations; second, they help us construct the response scoring rules that evaluate such student work to produce the range of possible values specified for each descriptor of performance outcomes/behaviors.

We describe student work in knowledge representations; of course, the valued representation trifles we created in Domain Analysis should give us a lot of information about how people in this subject matter domain communicate with each other the 'language' of the domain. For example, mathematicians use number systems and other symbols to communicate knowledge; architects use blueprints constructed from a standardized set of objects; dentists use tooth charts. Knowledge representations can be used to specify how information is to be captured from the student; they may also be used to specify how information will be conveyed to the student.

Parsing proto rules are used to describe how raw response data can be refined into a work product amenable to processing by evaluation rules. For example, parsing rules would determine how answer sheets containing penciled-in bubbles for could be turned into logical information in electronic form that could actually be scored with an automated key-matching algorithm.

Figure 11:
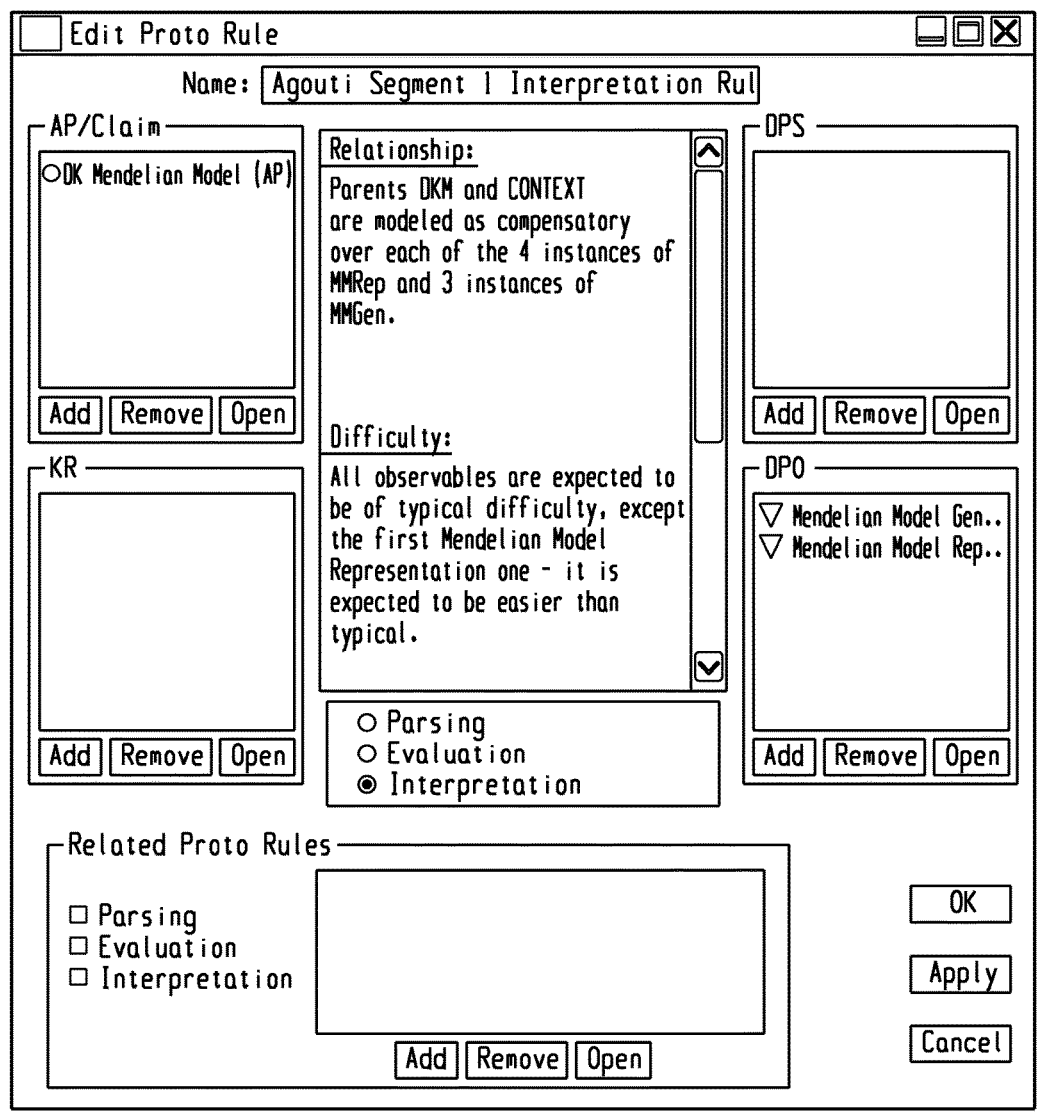
FIG. 11 illustrates an exemplary GUI form for entering interpretation proto rules.

We use Evaluation proto rules to create the rules that define how specific knowledge representations will be evaluated to produce values for descriptors of performance outcomes/behaviors (or what we observe). These rules are designed to group specification of what knowledge representation is being processed, what descriptor of performance outcomes/Behaviors is being set, and the text statements of the rule itself. We use interpretation proto rules to specify how descriptors of performance outcomes/behaviors impact aspects of proficiency in the proficiency paradigm. These rules are designed to group specification of what claim(s) are related to the descriptors of performance outcomes/behaviors, what aspects of proficiency are affected by what descriptors of performance outcomes/behaviors, and the text statements of the rule itself. So while evaluation proto rules tell us how to process the work coming from tasks, interpretation proto rules tell us how to use the results of that processing to support our claims. We use interpretation proto rules to identify which claims can be supported by the descriptors of performance outcomes/behaviors produced from a knowledge representations and which aspects of proficiency should be updated as a result of observing this evidence; interpretation proto rules are also used to begin to specify how much the observed values of descriptors of performance outcomes/behaviors should change our estimates of whatever aspects of proficiency are involved. FIG. 11 illustrates an example of an interpretation proto rule GUI form.

Once we have all these design objects in place, we can use them to build evidence paradigms. Evidence paradigms form a bridge between proficiencies and tasks. There are two parts to them: first, the bridge to the task side is an evaluation component consisting of the evaluation rules that process student work (knowledge representations) to produce values for descriptors of performance outcomes/behaviors; second, the bridge to the proficiency side is a 'weight of evidence' component consisting of interpretation proto rules that describe the impact of such descriptors on aspects of proficiency in a proficiency paradigm. This is a central piece of our validity argument since it makes explicit not only what we are measuring (proficiencies) and how we will get data from the student (knowledge representations), but lays out unambiguously what features of student work have evidentiary value, how these essential features are evaluated, and how those evaluations change our estimates of specific student proficiencies.

Once we have created some of the building blocks for our evidence paradigms, in particular the descriptors of performance outcomes/behaviors and the knowledge representations that would be the most likely containers for them, we can begin to work on tasks, using task paradigms. At this stage in assessment design, tasks and evidence are developed in an integrated and iterative manner. Task paradigms do not describe individual instances of tasks; rather they describe families or groups of tasks, all of which have certain features in common: the same knowledge representations for conveying information to the student; the same knowledge representations for capturing information from the student; the same set of descriptors of performance situations. The kinds of knowledge representations we need to see produced as student work are the primary linkage between evidence paradigms and task paradigms: since evaluation proto rules are designed to process a particular kind of student work (knowledge representation), obviously the related task paradigm must produce that student work. Therefore, the first step in developing a task paradigm is to include the knowledge representations that it will produce as student work. Beyond that, descriptors of performance situations are the primary building blocks for task paradigms. They are used to specify 1) the features of the knowledge representations presented to the student, 2) the focus of the actual task the student is asked to perform, and 3) the situation in which the knowledge representations are presented and the task request made. Therefore, the next step is to create the set of descriptors of performance situations relevant for a given family of tasks. Descriptors of performance situations include possible values the descriptor can take and an ability to assign the descriptor to one or more usage categories.

Once these descriptors have been defined, they can be used in combination with knowledge representations to build task paradigms.

Figure 12:
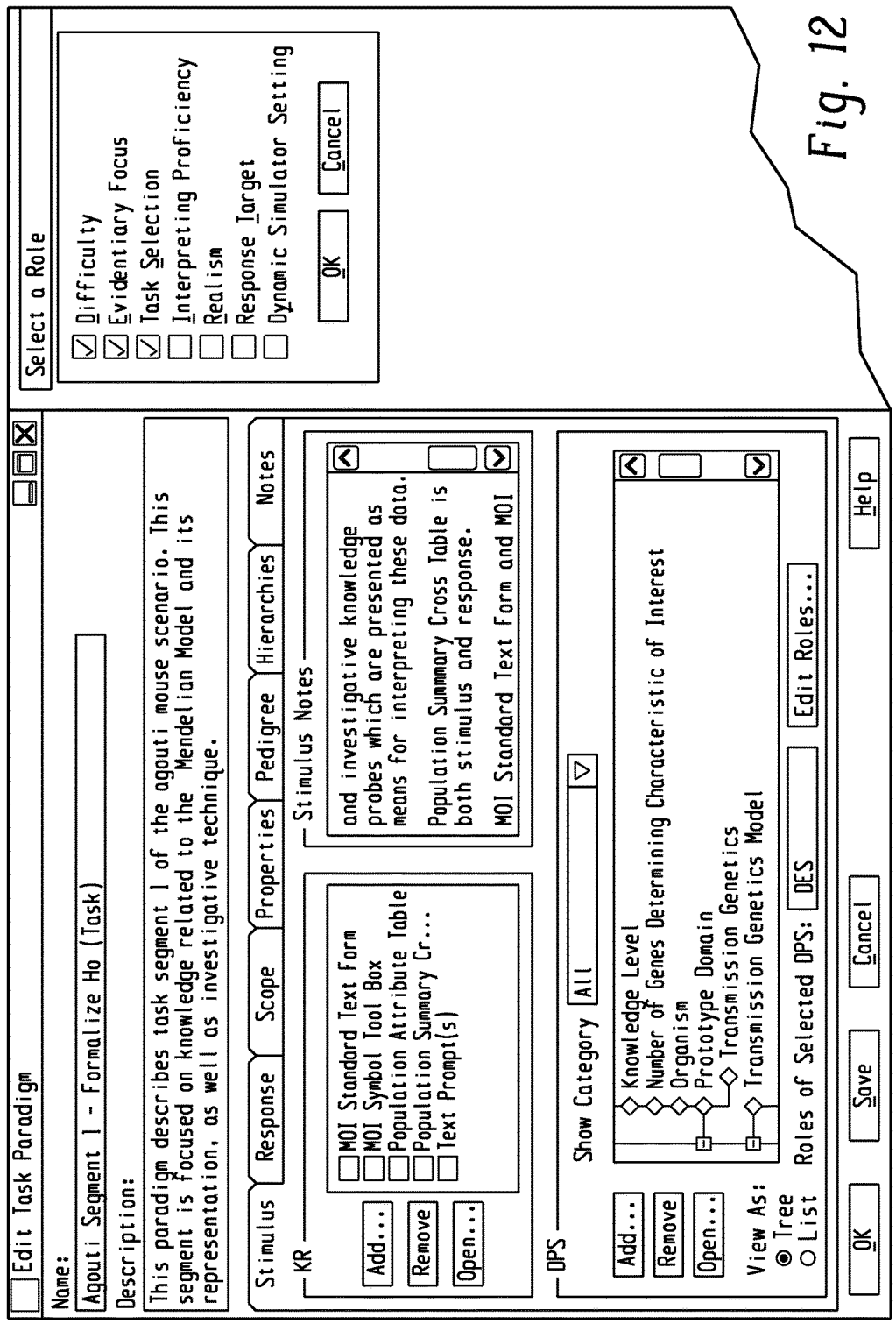
FIG. 12 illustrates an exemplary GUI form including roles of descriptors of performance situations in a task paradigm.

When a descriptor of performance situations is added to a task paradigm, it takes on a role; that is, while it may be a descriptor that describes something about the setting of a task (its category), every descriptor will play out in one of several different ways within a particular task paradigm. A descriptor in the setting category may affect the difficulty of the task in some families (paradigms), but only impact the realism of the task in other task paradigms. All tasks developed from the same task paradigm use descriptors of performance situations in the roles assigned to them in the paradigm. FIG. 12 illustrates example roles of descriptors of performance situations in a task paradigm.

Figure 13:
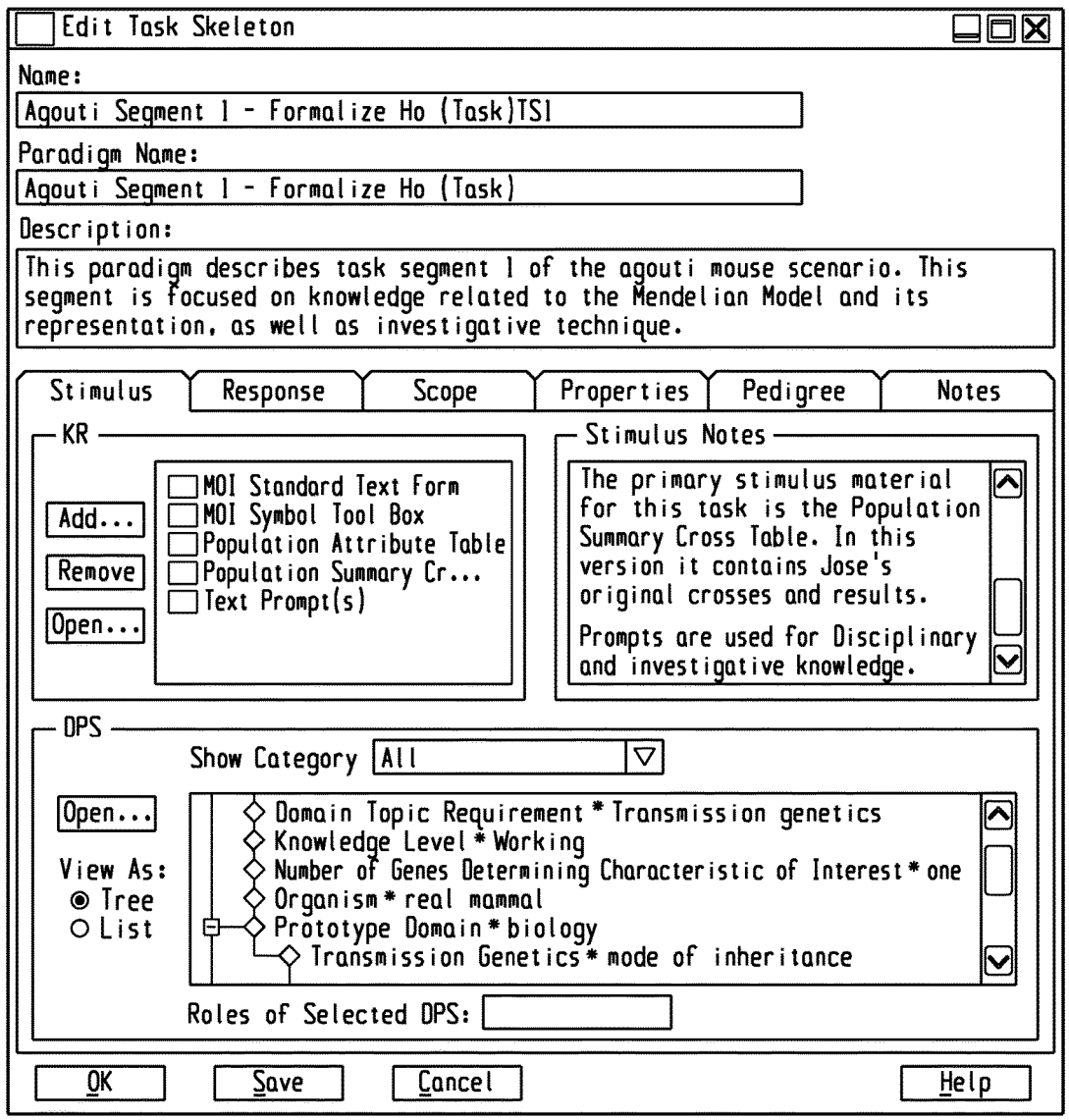
FIG. 13 illustrates an exemplary GUI form for a task skeleton.

The descriptors of performance situations in task paradigms are not set to any of their possible values; the values of the descriptors represent potential for tasks belonging to that family. However, task skeletons (FIG. 13) may be created from a task paradigm. Skeletons are versions of the task paradigm in which one or more of the descriptors of performance situations have been set to one of their possible values. Task skeletons are direct replications of their task paradigms that provide support for setting individual descriptors of performance situations to specific values.

The last step in Domain Modeling is to develop one or more assembly paradigms for a particular assessment. An assembly paradigm is a container for all the proficiency, evidence and task paradigms that would be used in a particular assessment. It facilitates consistency checking to assure that the proficiencies, evidence and tasks specified for an assessment in fact support the assessment's claims. In addition, the assembly paradigm provides support for specifying the task selection strategies and algorithms necessary to assemble forms, pools and vats of tasks for the assessment.

Conceptual Assessment Framework (CAF)

The purpose of the Portal Assessment Design System's Conceptual Assessment Framework (CAF) is to produce fully specified models which can be implemented as data structures for the operational processes required to deliver an assessment: presentation, evidence identification (response scoring), evidence accumulation (summary scoring), and activity selection (selection and sequencing). Design activities in the CAF use the aspect, paradigm, and proto rule collections created in Domain Modeling as the basis for development of 1) statistical models of proficiencies whose substance was modeled in proficiency paradigms, 2) statistical models of evidence whose substance was modeled in evidence paradigms, and 3) more complete specification of tasks modeled in task paradigms. In order to do this, the CAF is the place where all the considerations relevant to a specific implementation of an assessment are taken into account. Design activities in the CAF result in the creation and maintenance of a variable collection, a model collection, a materials collection, and a rule collection which are stored in the project data base.

There are three kinds of variables, which are used in different combinations to build three different models; three other kinds of models are built from different combinations of these three models. There are three kinds of materials and five kinds of rules.

The Portal system provides a conceptual and physical bridge between Domain Modeling and the CAF by facilitating use of aspects for creating variables via a promotion function: different kinds of aspects map logically to specific kinds of variables. The variables and models created in the CAF can also be traced back to Domain Modeling via a pedigree function, which allows linkage of any variable or model to one or more aspects or paradigms (which, in turn have a pedigree to their trifles which, in turn are bookmarked to their source documents). In this manner, a trail is completed that runs from the original sources of information for the assessment that carries through the design objects created at different design phases.

The Variable Collection

There are three kinds of variables: student model variables, evidence model variables, and task model variables. Variables are derived from aspects and are used as building blocks for models.

Student model variables are objects representing the specific knowledge, skill or ability important to measure in the subject matter domain for a particular assessment; the values defined for a student model variable represent meaningful (wrt the purpose of the assessment) and distinguishable levels of proficiency for that targeted knowledge, skill or ability. Student model variables thus concern characteristics of students. They are derived from aspects of proficiency. Student model variables differ from their related aspects in that their relationships with other student model variables can be specified statistically.

Evidence model variables are objects representing the specific observations that will be absorbed as evidence of particular student proficiencies. Evidence model variables (or observables) thus concern characteristics of performances. They are derived from descriptors of performance outcomes/behaviors. Evidence model variables differ from their related aspects in that their relationships with student model variables can be specified statistically.

Figure 14:
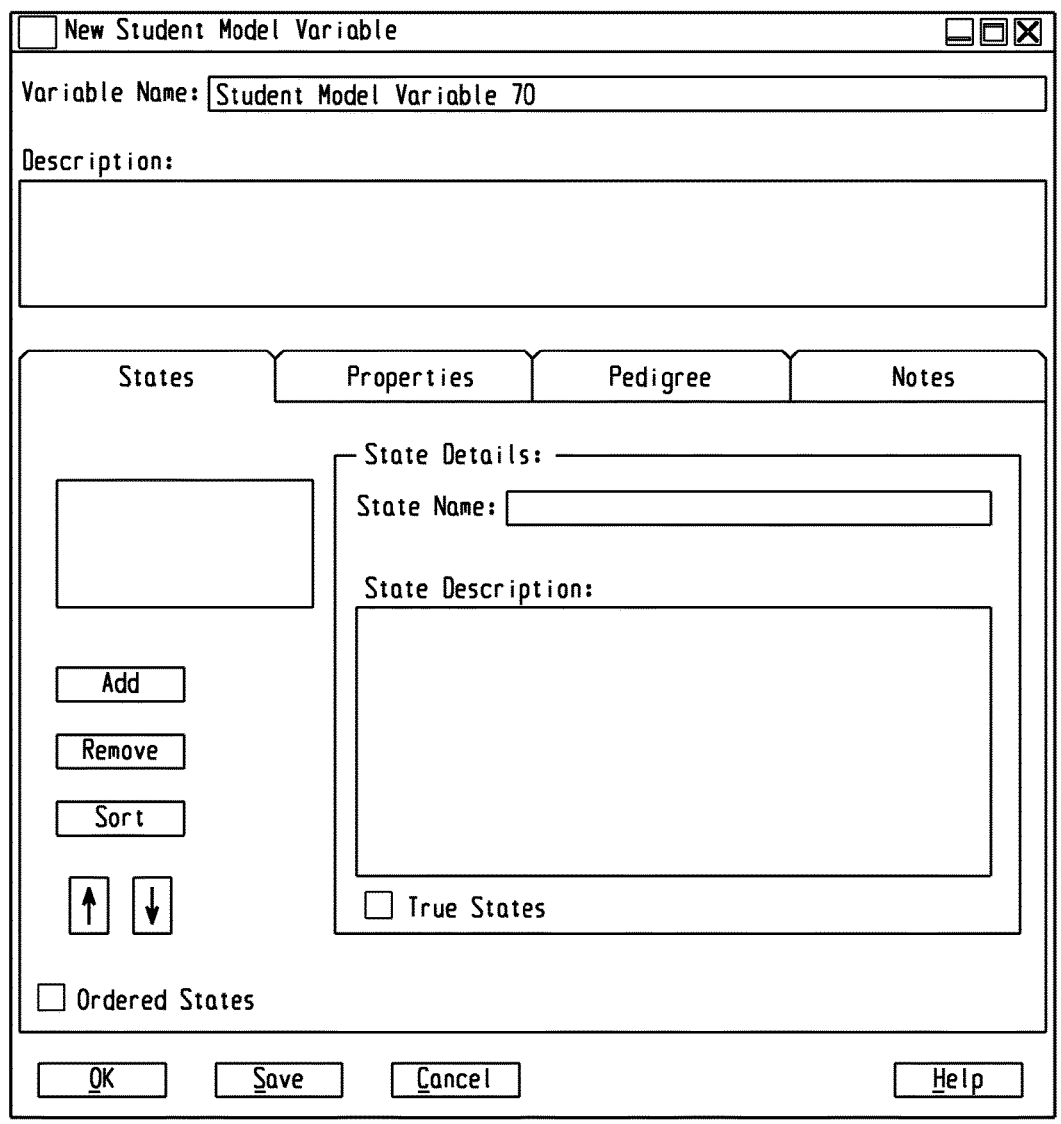
FIG. 14 illustrates an exemplary GUI form for entering information for the student model variable.
Figure 15:
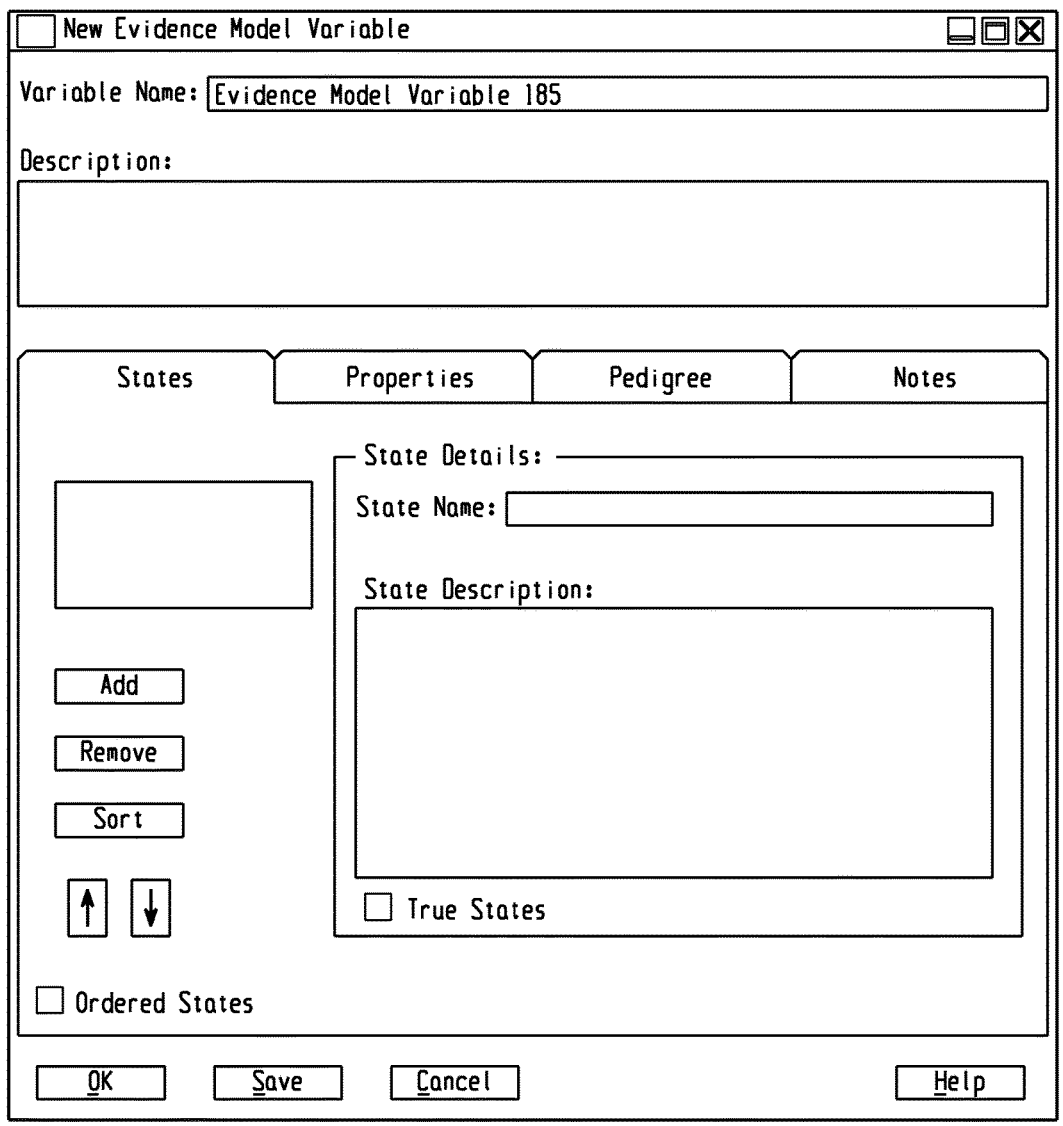
FIG. 15 illustrates an exemplary GUI form for entering information for the evidence model variable.

Task model variables are objects representing the specific features of task families that will be used to elicit the student work and performances necessary to making required evidentiary observations. These are the features that need to be specified when a task is actually authored (that is, implemented). Task model variables thus concern characteristics of the situations in which evidence is obtained. They are derived from descriptors of performance situations. Task model variables differ from their related aspects in that they have been particularized to the constraints and affordances of a particular assessment product and contain information needed for the task authoring processes that occur as part of implementing an assessment (subsequent to design). Similarly to domain analysis and domain modeling, GUI forms may be used for generating and editing task model variables. FIG. 14 illustrates a GUI form for entering information for the student model variable, and FIG. 15 illustrates a GUI form for entering information for the evidence model variable.

Figure 16:
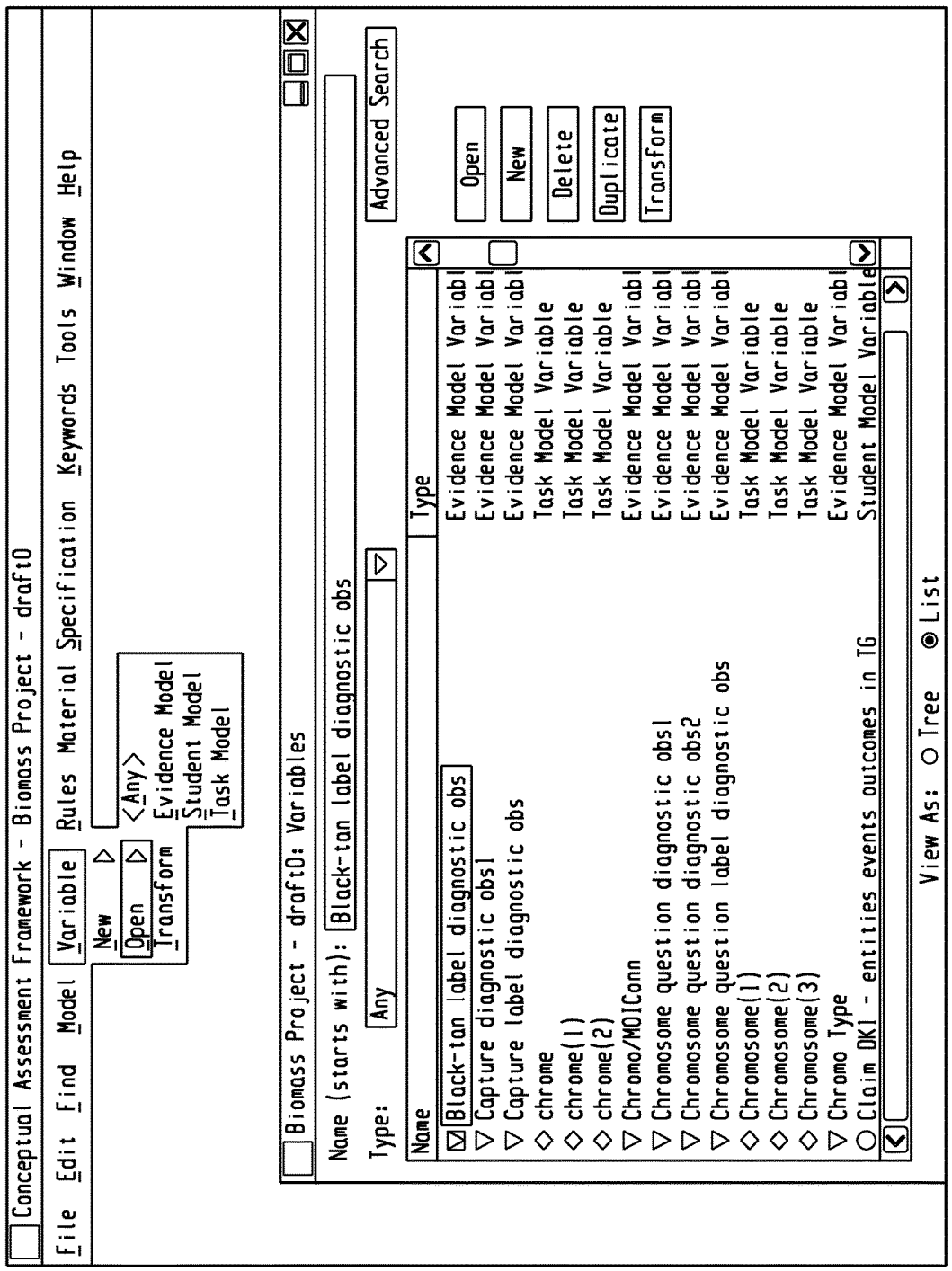
FIG. 16 illustrates an exemplary GUI form for variable management.

Users manage their variable collection through the variable management form which, in addition to the functionality supplied via the menu bar, helps users create, edit, and retrieve variables. FIG. 16 illustrates a variable management form.

The Model Collection

There are six kinds of models: student models, evidence models, task models, assembly models, presentation models and delivery models. Different variables in different combinations are used to build student, evidence and task models; assembly, presentation and delivery models are built from different combinations of models. Models are used to organize pieces of related information into data structures that can be used directly to implement data structures required by the four kinds of assessment delivery processes: presentation, evidence identification, evidence accumulation and activity selection.

Student models contain both descriptive and quantitative information specifying for which knowledge, skill and ability evidence will be accumulated across tasks and summary feedback will be reported. They are constructed from student model variables, reporting rules, and target rules. Because the student model is where we manage our uncertain knowledge about these variables, it also includes statistical definitions of relationships among the student model variables it contains, the levels of proficiency (states) within any given variable, and how different levels of proficiency defined for one or more variables can be interpreted as a claim about the student who participates in the assessment (relevant claims created in Domain Modeling participate indirectly in student model development through student model variable development and reporting rule specification.)

Evidence models contain both descriptive and quantitative information specifying how different kinds of evidence relate to the variables of interest in the student model. They are constructed from evidence model variables, student model variables, material specifications, and task model variables. They also contain evidence rules that evaluate specific student work to produce values for evidence model variables. Evidence models link to student models and task models.

Task models specify features shared by task families, where a family is defined as a group of tasks having similar content and response requirements. Task models are constructed from material specifications, task model variables, and specification rules. Task models link to evidence models and presentation models. Task models differ from task paradigms in that the task model variables and material specifications they comprise are fully specified for meeting the constraints of a particular assessment product. Task models contain material specifications (type=Work Products) that must be compatible with evidence rules specified in the related evidence models and that also must be compatible with presentation capability described in the related presentation model (type=Presentation Material and type=Work Products).

Assembly models specify the collection of models and the selection of strategy(ies) that are needed to assemble a form, pool or vat of assessment tasks. They are constructed from student, evidence and task models and constraint rules.

Presentation models specify the requirements for a collection of task models with respect to capability for presenting materials to assessment participants and capturing work products from assessment participants.

Delivery models contain the collection of models that constitute specifications for the four assessment-delivery system processes: task models and presentation models for the presentation process, evidence models for the evidence identification and evidence accumulation processes, assembly models for the activity selection process.

The Material Specification Collection

There are three kinds of material specifications: presentation material, evidence rule data, and work products. Presentation material specifies the material presented to the assessment participant and must be compatible with delivery system presentation process capability; presentation material is derived from Domain Modeling knowledge representations. Evidence rule data specifies the material (e.g., solutions or keys) that evidence rules (type=Evaluation) use to evaluate work products; evidence rule data is derived from Domain Modeling proto rules (evaluation). A work product specifies the material captured as a response and processed by the evidence rules (type=Parsing and type=Evaluation) and must be compatible with delivery system presentation process capability; work products are derived from Domain Modeling knowledge representations.

The Rule Collection

There are five kinds of rules: reporting rules, evidence rules, specification rules, target rules, and constraint rules.

Reporting rules are contained in student models. Evidence rules (type=parsing) are used to process raw task response data to produce a work product for an evidence model; evidence rules (type=evaluation) also process these work products to produce values for the evidence model's variables. Evidence rules are derived from Domain Modeling proto rules. Specification rules are contained in task models and are used to process presentation material to produce values for task model variables. Constraint rules and target rules are contained in assembly models and are used to select tasks for forms, pools and/or vats.

Doing Design in the CAF

The primary goal of developing these design objects in the CAF is to create models sufficiently detailed and quantified that they provide adequate specification of data structures for the assessment's implementation and delivery processes. As stated above, the Portal Assessment Design System provides support for refinement of design objects over multiple design phases, with each phase using objects created in the previous phase as the starting point for creating new and more refined design objects.

Although the fundamental design questions remain constant across phases, in the CAF we have the following additional question to answer:

How do the requirements (constraints) for a particular assessment product modify the design we have created in Domain Modeling?

These constraints typically relate to the processes required to deliver the assessment. These are illustrated in the diagram below.

Figure 17:
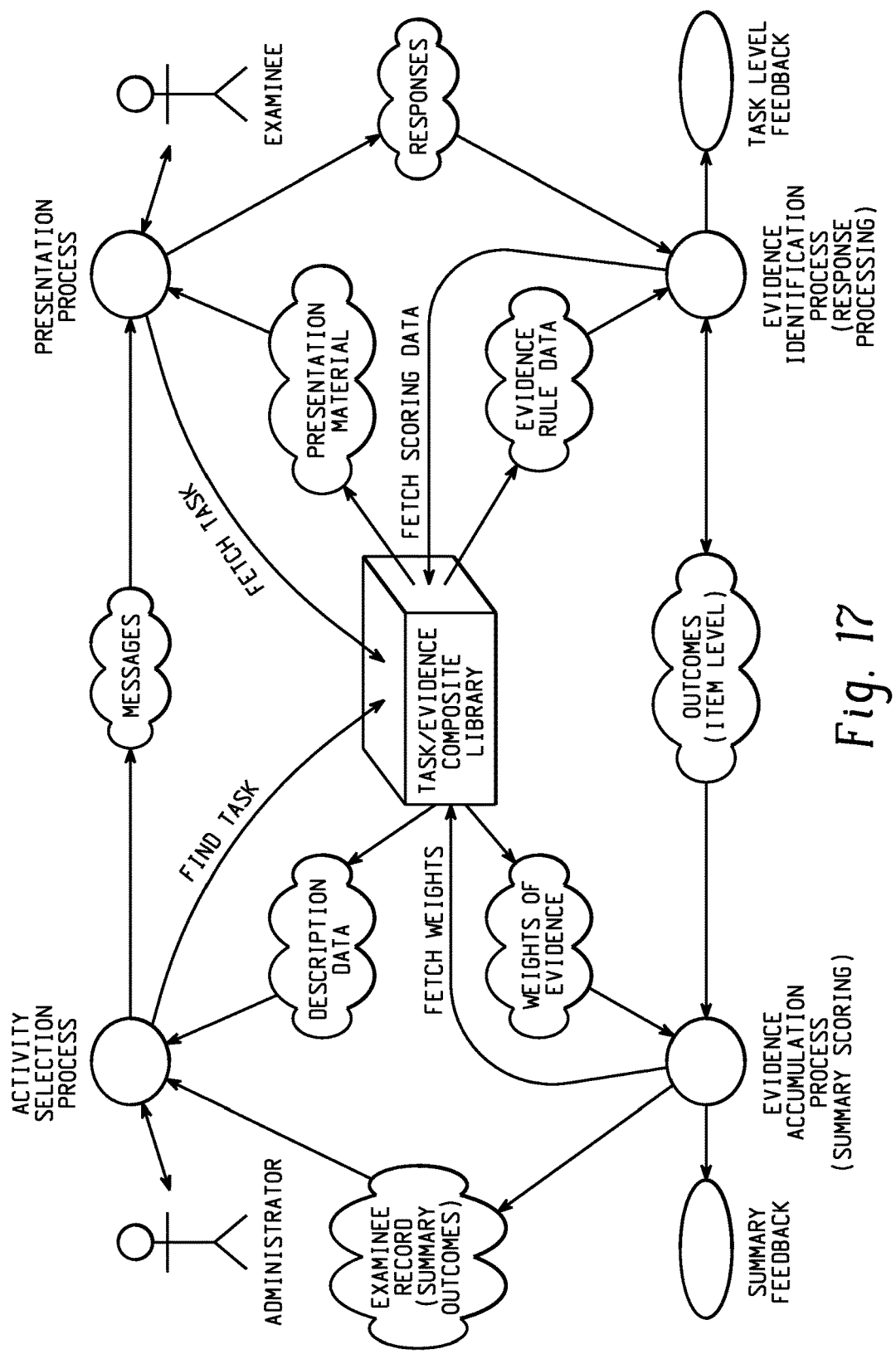
FIG. 17 illustrates a four process assessment delivery system.

Mapping Evidence-Centered Design CAF Objects to Assessment Delivery System Processes The Four Process Assessment Delivery System architecture is shown in FIG. 17. One of the benefits of using the evidence-centered assessment design object model is the way in which it maps to the operational processes required to deliver an assessment. This object model also informs implementation processes (e.g., item authoring) and maintenance processes (e.g., statistical calibration). The CAF is the design phase during which the constraints that exist in delivery system processes must be traded off against the requirements of claims, content and purpose already represented in the substantive design of the assessment. The CAF models described map to delivery system processes as depicted in FIG. 18.

Figure 18A:
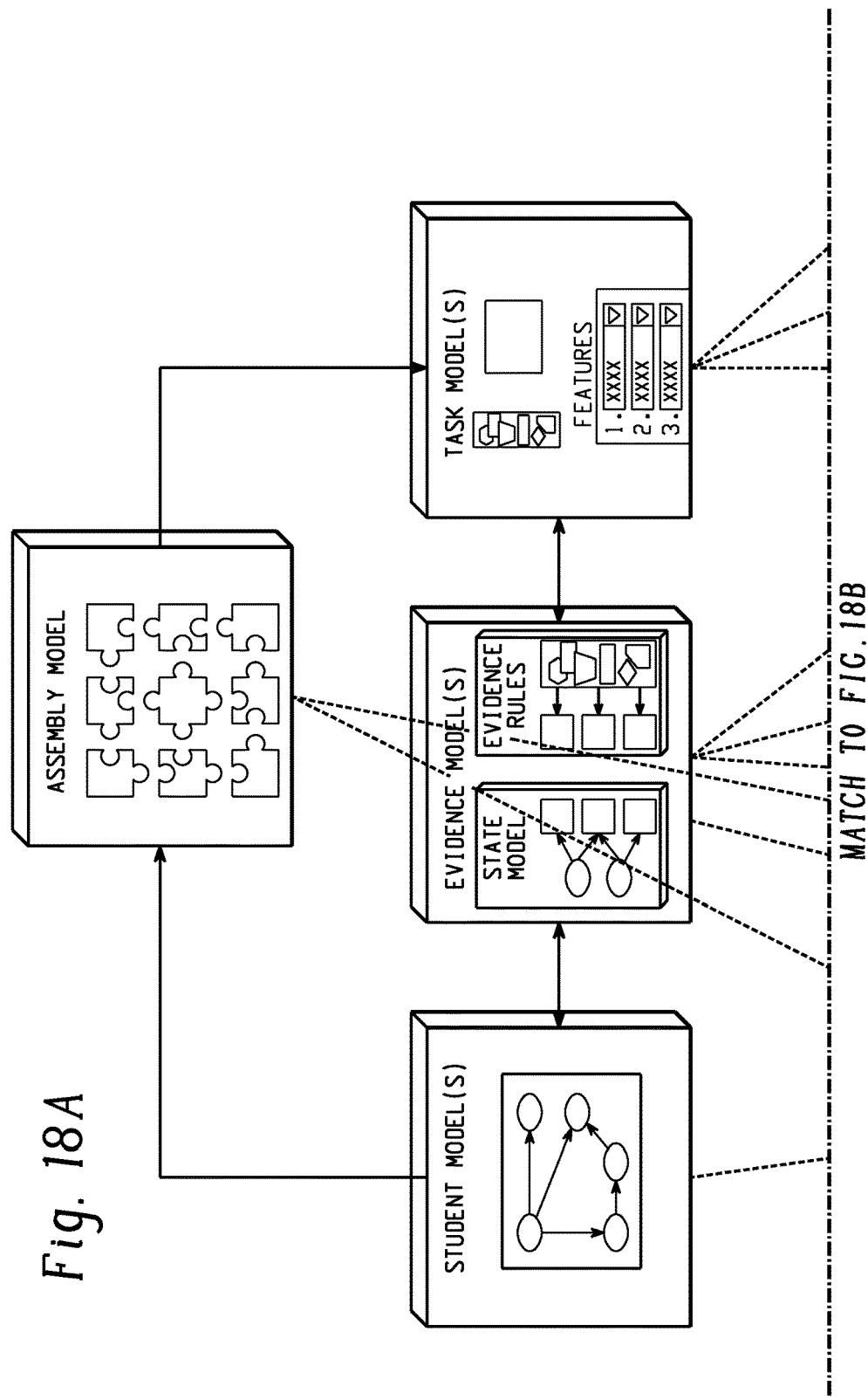
FIGS. 18A-B illustrates that assessment design in the CAF includes an interaction between delivery processes and CAF models.
Figure 18B:
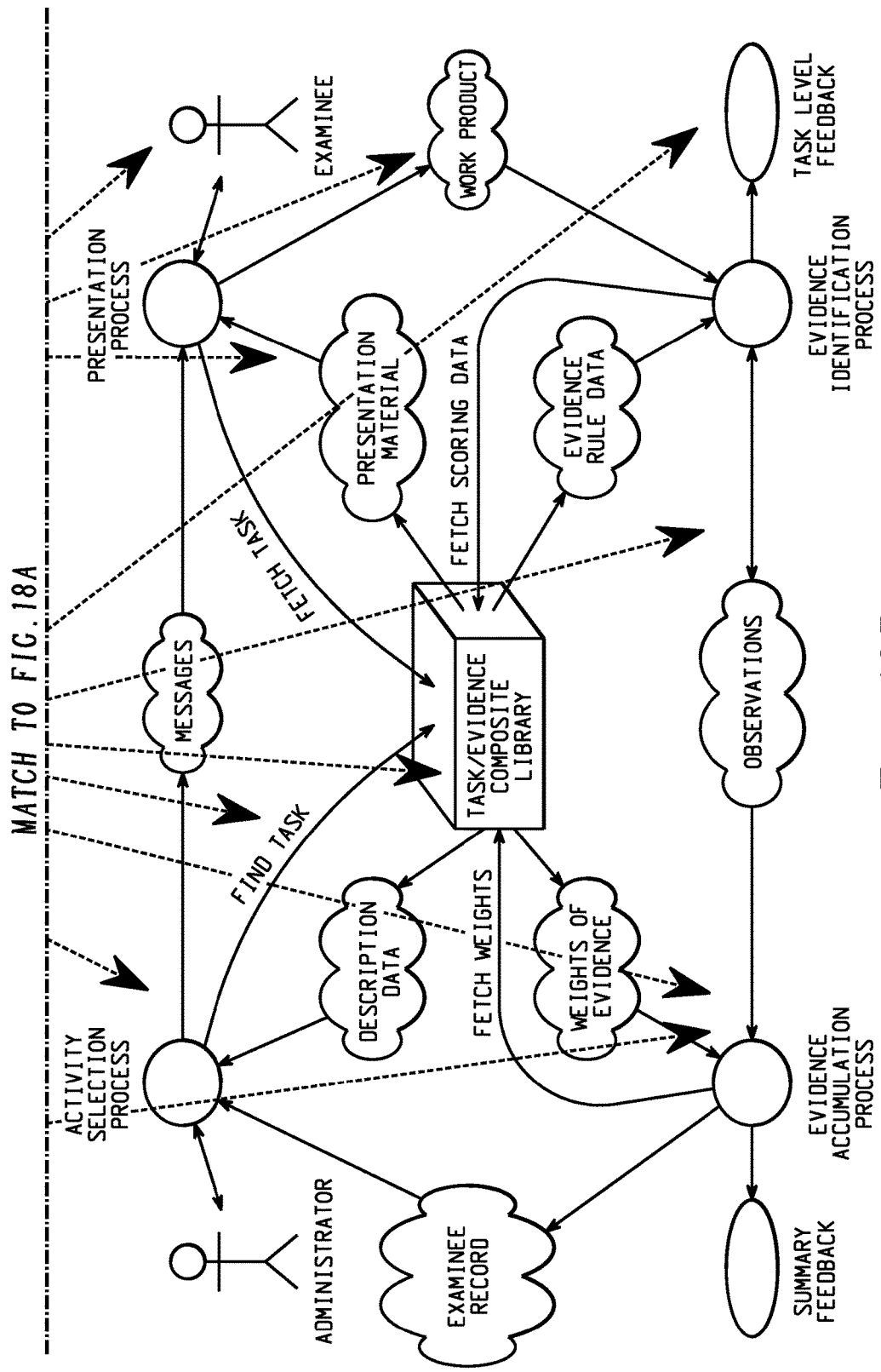

FIGS. 18A-B illustrates that assessment design in the CAF includes an interaction between these processes and CAF models. CAF objects may have to be created to be compatible with hard constraints for existing delivery processes (e.g., paper & pencil presentation, automated key-matching algorithms for multiple choice responses, number right summary scoring); or CAF objects may be created as specifications for novel delivery system processes (e.g., Web presentation, automated scoring for open-ended performances, Bayes net summary scoring on multiple aspects of proficiency). It is important to note that delivery process requirements cannot be considered piecemeal: the response captured by the presentation process impacts response scoring which, in turn, impacts summary scoring. Even though the CAF concerns itself with the bridge to implementation, it goes without saying that, whatever the constraints on various delivery system processes (or the implementation processes involved in creating the content and operationalizing these processes) CAF objects must ultimately accommodate both assessment purpose and the substantive validity argument represented in domain model design objects.

Figure 19:
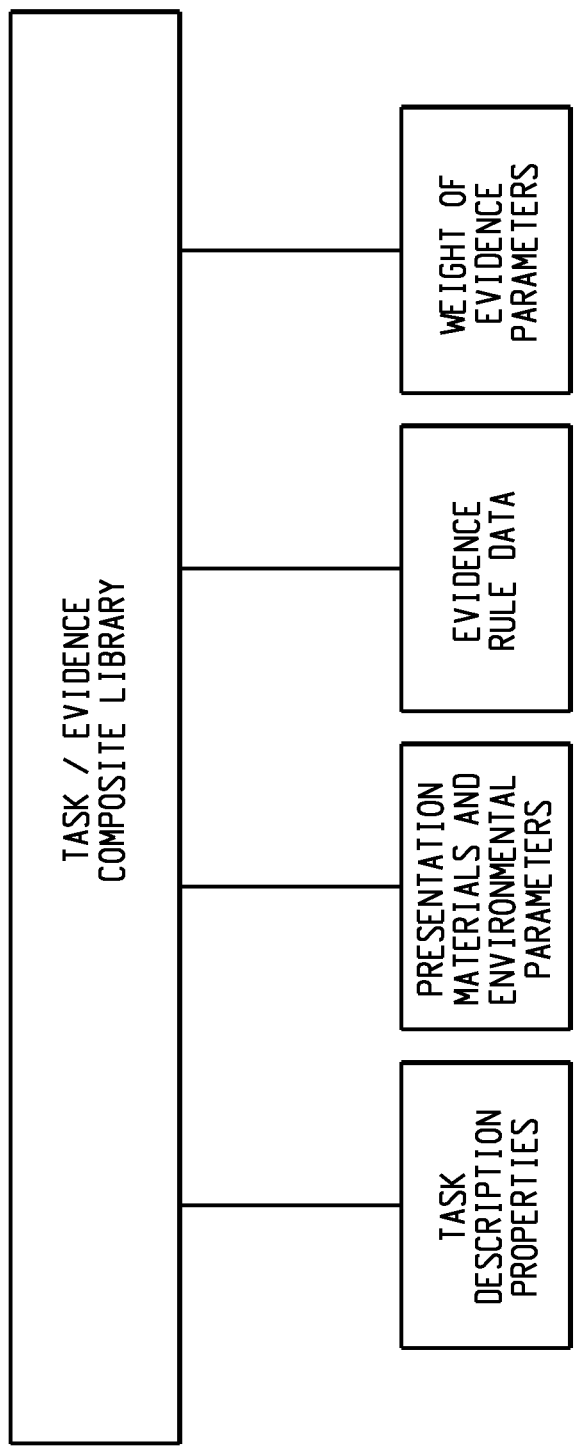
FIG. 19 illustrates the task/evidence composite library, which contains all information necessary to support the operation of the four delivery processes for a specific assessment.

FIG. 19 illustrates the task/evidence composite library, which contains all information necessary to support the operation of the four processes in delivery of a specific assessment. The information contained in the task/evidence composite library, which takes the form represented below, is derived from CAF models because the models supply the specifications for implementation of data structures for the various processes. Therefore, infrastructure processes, which are focused on implementation and maintenance of this information, can similarly be mapped to the relevant CAF models.

The role of the CAF models, then, is to serve as the bridge between design and implementation of an assessment's validity argument. This mapping is a very valuable dimension of using the evidence-centered assessment design object model.

Following from this, therefore, the goal of activities in the CAF is to take the substantive models developed in Domain Modeling and integrate them with the additional information resulting from the application of specific product requirements and constraints. Using the paradigms constructed in Domain Modeling as the substantive foundation, design activities in the CAF undertake to transform the substantive, or qualitative, validity argument into one that can be modeled statistically via the student model (what claims, or inferences, we want to make about examinees who participate in the assessment), the evidence models (what we need to observe as evidence in support of these claims), and the task models (the situations and tasks that afford the examinee the opportunity of providing such evidence). Models therefore focus on the quantitative aspects of relationships among proficiencies, evidence, and tasks resulting from design features constrained by implementation and operational requirements for a particular product. Models must also include other requisite technical information for use in implementation processes (e.g., authoring of task material for presentation via a particular platform or medium, implementation of automated response scoring or task selection functions).

We use the Domain Modeling collections of aspects and paradigms to build on in continuing our design. Using the Portal system, design of a new assessment proceeds during the CAF phase as follows:

The first order of business is to select those claims, from the universe we defined in Domain Modeling, that are most relevant to the assessment product. In order to do that, we consider the questions [Who is going to be assessed and for what purpose(s)? and Who are the intended audiences for information coming from the assessment?] much more narrowly; that is, not who could be assessed (e.g., any high school biology student), but rather who will be assessed (e.g., remedial high school biology students). The purpose of the assessment sharpens focus to support learning in this particular population of students, as does the definition of the audience for assessment information (e.g., teachers and parents of remedial students, as well as the students themselves). Taking this information into account has important consequences for the selection (from the potential universe) of claims we will want to make about these students.

Once we have selected the claims relevant for this product, we can refine our idea of which aspects of knowledge, skill and ability we will have to measure. Although we have defined a potential collection of these aspects in Domain Modeling and used them to construct proficiency paradigms, our now circumscribed set of claims may mean that certain of these aspects are no longer of interest to us. When we have selected the set of aspects of proficiency to match our claims, we transform them into student model variables in the CAF. The next step is to consider how to construct a student model using these student model variables. We can use a related proficiency paradigm to guide the structure of relationships among variables in the student model. It is important to keep in mind that the design of the proficiency paradigm in Domain Modeling was guided by the claims for which evidence would be required; that is, it provided an explicit structure for defining the assessment's evidentiary requirements. In the CAF, however, we are primarily concerned with the operationalization of this paradigm; that is, given the purpose of the assessment, what will have to be reported and how will the student model have to be structured to optimize it computationally.

Now that we have our claims and we have our student model, we need to think about formalizing the relationships between claims and the student model. That is, we need to define states for our student model variables and reporting rules for our student model. The relevant claims in our example assessment relate to a student's mastery of particular science standards-based aspects of biology knowledge, skill and ability; that is, they place students at different levels of mastery for particular aspects (represented by the student model variables) of a standards-based high school biology course. The claims we report are actually the final outcome in an entire chain of inference—from how we update our estimate of a student's proficiency based on observable evidence (addressed in evidence models), to how we interpret the final estimate as a claim. As stated previously, a claim can be mapped to a particular state of a student model variable, or it may be an inference we make as the result of combining states on multiple student model variables.

Figure 20:
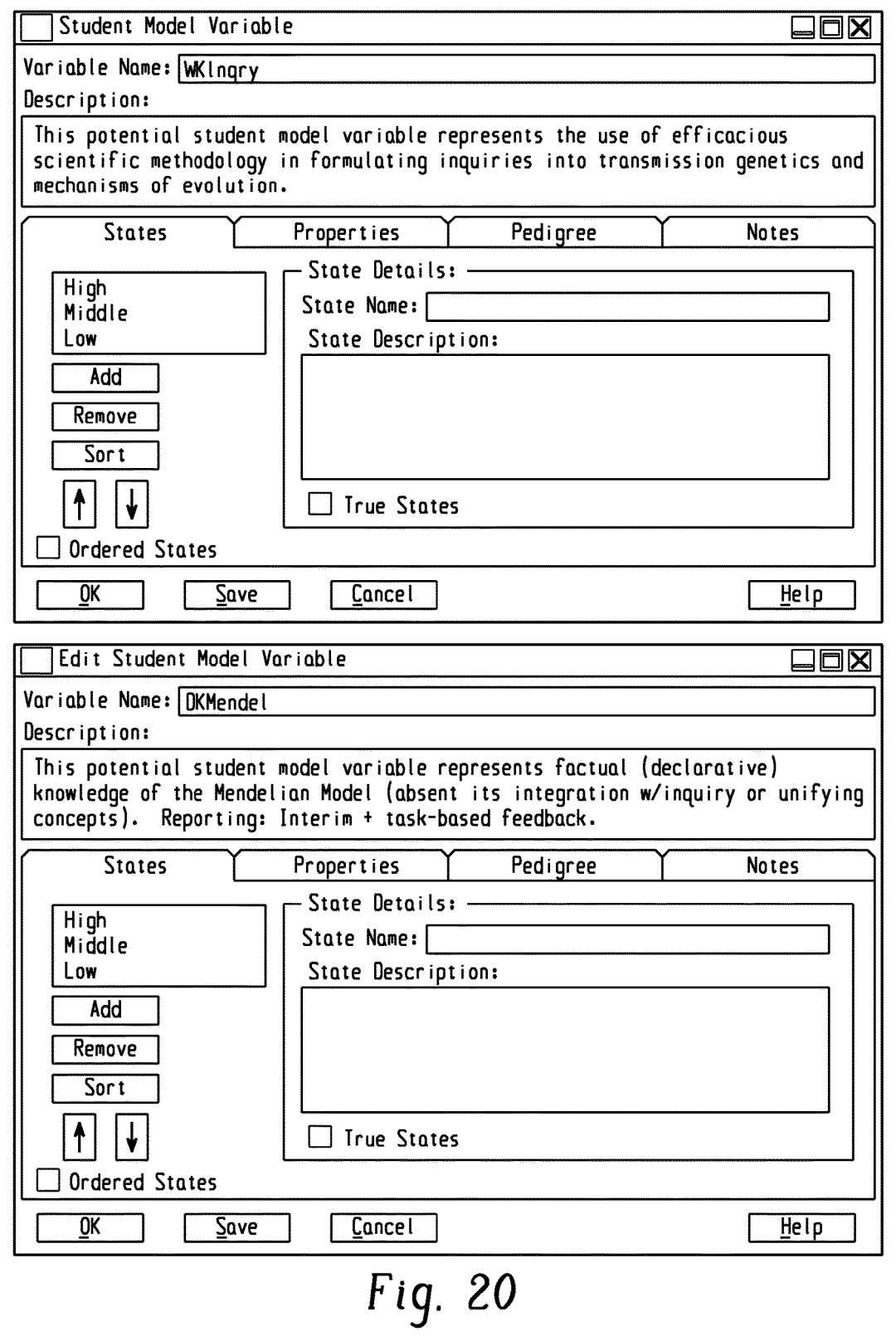
Figure 21:
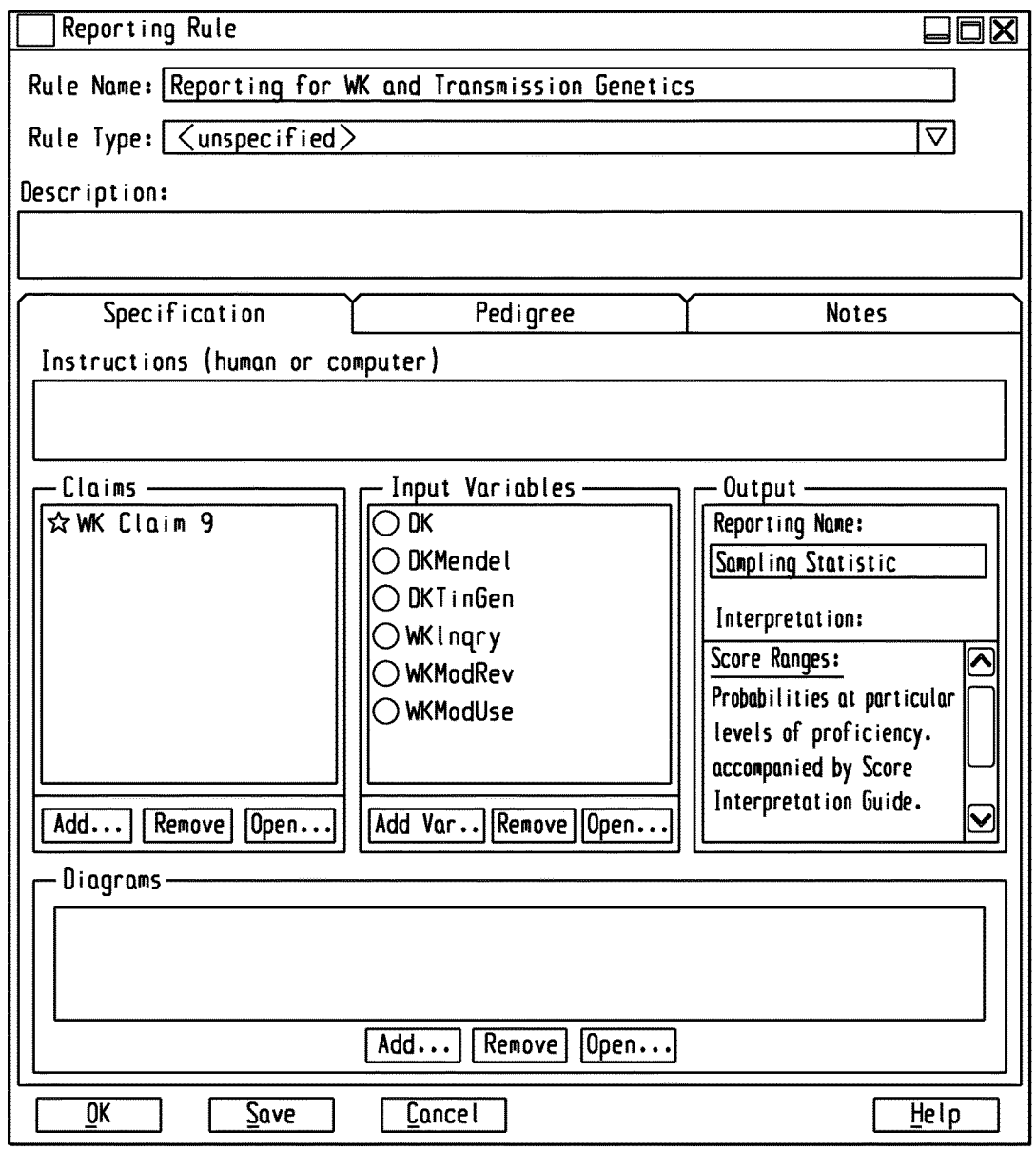
FIG. 21 illustrates a GUI form for entering a reporting rule for the student model.

In either case, every claim we want to make explicitly with respect to the results of the assessment needs to be defined in a reporting rule, where the rule describes how a particular value of a student model variable, or particular combination of values of multiple student model variables, maps onto a claim that appears in some form in the assessment's score report. Reporting rules are contained in the student model. FIG. 20 illustrates a GUI form for entering the student model variable with its states. FIG. 21 illustrates a GUI form for entering a reporting rule for the student model.

Figure 22:
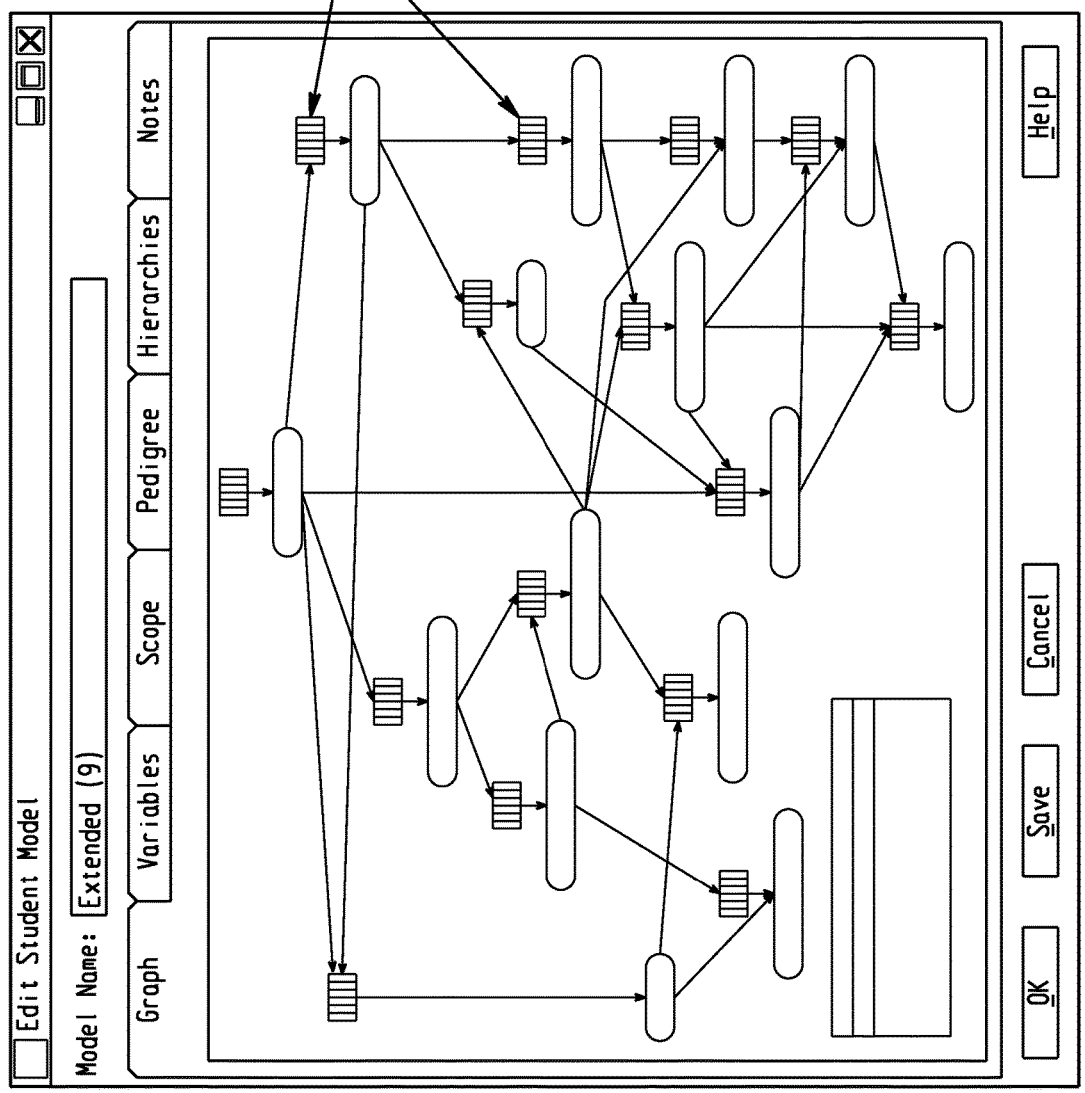
FIG. 22 illustrates an exemplary GUI form for entering the student model with its distribution objects.

The final step in creating the student model requires specifying statistical relationships among the variables in our student model. To this point, the structure of the student model, as guided by the relevant proficiency paradigm, simply tells us what is connected to what. These relationships indicate dependencies among the various aspects of knowledge, skill and ability. In our example student model (see FIG. 22), for instance, the student model variable WK (Working Knowledge) represents use of disciplinary (declarative) knowledge in ways that require cross-disciplinary connections and/or relationships with unifying concepts. Therefore, in the student model this variable is connected to DK (Disciplinary Knowledge i.e., domain-specific facts and procedures) in a way that means that students' state with respect to Working Knowledge depends on students' state with respect to Disciplinary Knowledge—in other words, students' success in actually using domain-specific knowledge in various ways depends on their degree of mastery of disciplinary knowledge. Specifications for an operational student model must not only define the substantive nature of these dependencies, they must also define the quantitative effects of updating these variables; i.e., the impact of the direction and magnitude in change of state for any given variable must be defined for its dependent variables. CAF functionality supports statistical specification of these relationships in terms of probability distributions. These distributions are defined via conditional probability tables. Student model variables are typically initialized to states that reflect assumptions (derived from expert opinion) about the population of individuals who will take the assessment. FIG. 22 also illustrates an example of the student model with its distribution objects.

Now that we have developed an initial version of our student model, we can proceed with task and evidence model development. In the development of our task models, we begin with the design of task materials to be presented to examinees and the work products that capture student work. In the CAF, task materials presented to examinees are described in presentation material design objects. Information captured from students as their responses is described in work products. Presentation material and work products are both derived from the domain-specific knowledge representations developed in Domain Modeling. However, they are particularized to the presentation process used in delivery. (Reference to the delivery system figure reminds us that the presentation process not only presents task materials, but also captures student work.)

Work products are also an important element of evidence models. Work products are design objects that describe how the substantive response to be evaluated (defined as a knowledge representation processed by proto rules in domain modeling) is customized to be compatible with presentation process requirements. In the domain of transmission genetics, the nature of the information an examinee must communicate in constructing the standard form of a hypothesis related to mode of inheritance consists of chromosome type, alleles, dominance relationships, and phenotype/genotype relationships. This sort of task could be implemented in a variety of ways (e.g., free-form construction of the hypothesis, selection of the correct hypothesis via multiple choice response). In the example work product shown above, the web-based presentation requirement has resulted in a drag/drop task. Work products actually constitute the bridge between task and evidence models and between presentation and evidence identification processes; the presentation process must be able to capture the work product that the evidence rules in the evidence associated evidence model are designed to evaluate for production of observable variable values.

In addition to containing definitions of presentation material and work products, task models provide the means to define the collection of task model variables that specify all aspects of the performance situation, including content characteristics of presentation material (i.e., stimulus, prompt, instructions) and the task environment (i.e., tools, scaffolding, etc). Once a collection of task model variables has been included in a task model, their roles in that particular task model can be determined. It is important to keep in mind that the only difference between task paradigms and task models is that task models specify a particular implementation of the substance described in the paradigm. Given this fact, task models serve as specifications for the authoring of the presentation materials as well as for dynamically variable task-dependent aspects of the presentation process. Increasingly detailed specifications for groups or families of tasks can be created using task specification design objects, which (like task skeletons in Domain Modeling) allow for the setting of particular values for one or more specific task model variables. The actual authoring of a specific task (which is outside the scope of design) must be consistent with the values for task model variables in the task model or task specification from which it is derived. Presentation material, work products and task model variables are all derived from Domain Modeling aspects and can be created via promotion.

With the completion of the task model, we move on to specification of its related evidence model. It is important to note that the sequence of the design process in the CAF differs somewhat from that in Domain Modeling: in Domain Modeling, once the knowledge representations have been defined, one goes back and forth between evidence and task models working through the needed observables. However, in the CAF sequence, since the substance has already been modeled, task and evidence models can be developed in a more linear way.

Figure 23:
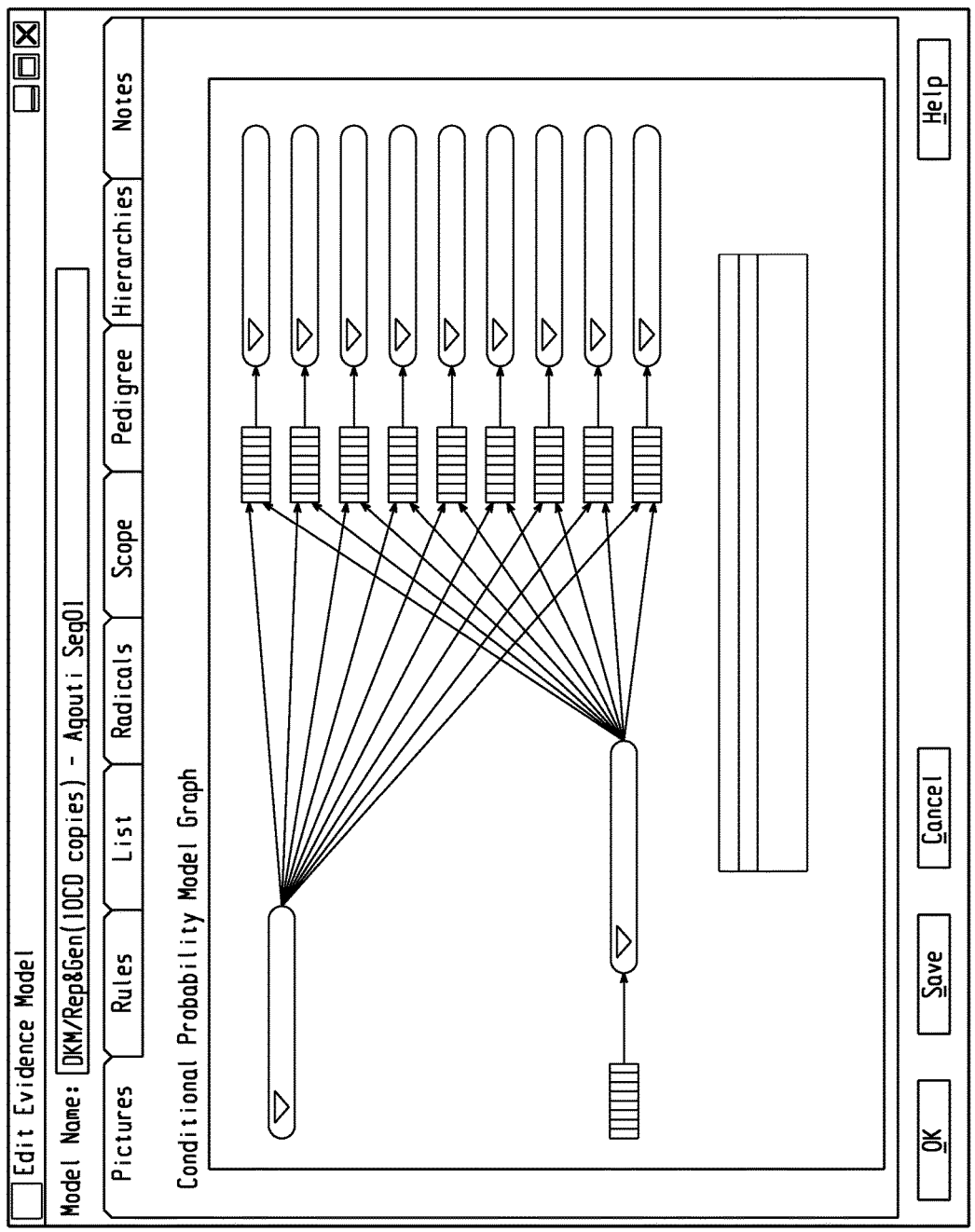
FIG. 23 illustrates an exemplary GUI form for entering the evidence model.

Because the bridge from task to evidence models is the work product, we begin with elements of the evidence model that relate to the work product. A work product contains the examinee's response as constructed and captured in a particular presentation process. Evidence rules of the parsing type 'unwrap' the response (for example, bubbles on an answer sheet must be scanned to create an electronic representation of examinee responses that can actually be evaluated in an automated way). (Depending on the interface between presentation and evidence identification processes, parsing may or may not be required.) Evidence rules of the evaluation type process the 'unwrapped' work product to produce values for observable evidence model variables. Observable evidence model variables are derived from descriptors of performance outcomes in our aspect collection; they can be created via promotion. Evidence rules are derived from proto rules. Again, the difference between proto and evidence rules is that evidence rules address both the substance specified in the proto rules and the requirements of the evidence identification process; that is, how the rules are to be operationalized. FIG. 23 illustrates an example of the evidence model.

We have seen that evidence paradigms and evidence models have analogous elements that address the evidence identification process. In an evidence paradigm, the evaluation type proto rules specify how knowledge representations produced as student work are to be processed to produce values for performance outcomes. In an evidence model the equivalent elements are evaluation type evidence rules, work products and observable evidence model variables. Evidence paradigms and evidence models also have analogous elements that address the evidence accumulation process. In an evidence paradigm, interpretation type proto rules specify which aspect(s) of proficiency are updated by which performance outcomes; the magnitude and direction of this updating are also addressed in interpretation type proto rules, but only descriptively. In an evidence model the element that addresses evidence accumulation is specified statistically as a graph that incorporates evidence model variables, the student model variables they update, and statistical distributions between them that formally characterize magnitude and direction of updating.

In addition, evidence models differ from evidence paradigms in that they do not need to maintain substantive distinctions among evidence model variables. This is true because evidence models are operationalizations of evidence paradigms (which have already accomplished substantive design). They need to be optimized for operational conditions. Therefore, the statistical portion of an evidence model (that is, the student model variables updated, the number of observable evidence model variables, and the structure of the relationship between student and evidence model variables) may be created to be reused with different evidence rules across multiple evidence models. This is illustrated in the example evidence model, whose graph represents the relationship of several evidence model variables (common across different task models) and their student model variable 'parents'. This is an example, therefore, of an evidence model that can be re-used with different tasks. However, while the structure of evidence models may be common across many tasks, the distributions that describe the magnitude and direction of updating vary from task to task. An interesting and critical design activity in moving from Domain Modeling to the CAF is the taking into account of delivery system process requirement impact on the validity argument. For example, if student work captured by a presentation process has to be implemented in the form of multiple choice response work products, the evidence observed in such responses (i.e., observable evidence model variable values produced by evidence rules) may have a considerably different impact on related student model variables than evidence observed in responses captured as open-ended constructed response work products. Therefore, the design information contained in interpretation type proto rules must be considered carefully in developing statistical evidence models that are consistent with such work product constraints. (It should be noted that constraints on work products may arise from either presentation or evidence identification process requirements—or both.)

As many task and evidence models must be developed in the CAF as are necessary to provide support for the assessment's claims. The nature of the observations necessary to support any given claim was originally defined in Domain Modeling. The task models we develop in the CAF formalize the requirements for various kinds of observations by taking delivery requirements into account. However, the number of observations of various kinds needed to support the assessment's claims has not yet been addressed. In the CAF we must rely on information collected from research and operational assessments (stored as various types of operational trifles) to provide the backing for decisions made with respect to how many of each kind of observation is necessary. This information contributes to the development of the assessment's assembly model. The assembly model pulls together the assessment's student, evidence and task models, as well as its reporting rules (which reference claims). At this point a consistency check can be done to assure coherence of the various models. The number of observations required is expressed as target rules and constraint rules (as applicable). Target rules use student model variable states as the means of determining (during assessment administration) how many of which kinds of tasks (each of which yields specific observations) need to be included in an examinee's form. Given that this means of assembling an examinee's assessment form is consistent with purpose, the use of target rules can induce significant requirements for delivery system processes (particularly evidence accumulation and activity selection). Constraint rules use task characteristics (as specified via task model variables) as the means of determining how many of which kinds of tasks need to be included in an examinee's form. (The number of various kinds of observations needed of course guides task pool development through authoring of individual tasks using CAF task models and task specification objects.)

Working through design activities in the CAF to produce a student model, an assembly model and collections of evidence and task models completes work on the validity argument for the assessment. Our activities now have to focus on assuring that all the constituent elements are packaged together in a way that integrates the necessary information for delivery of the assessment. This is achieved through use of CAF presentation and delivery models. The presentation model is a collection of all the task models that have to be accommodated by the assessment's presentation process. In addition, the presentation model specifies non-task specific characteristics of the presentation environment. The presentation model is important because it represents an aggregation of all presentation requirements; considering such requirements in the aggregate is valuable to the extent that it reveals complexities and incompatibilities not apparent in individual task model requirements.

The CAF delivery model enables putting all the pieces together to create a container for all elements of the design, along with additional properties for specifying delivery process requirements. This is the last step in the design process for a new assessment.

Where Design Leaves Off and Implementation Begins

The CAF represents the last phase of assessment design activities. That is, most models produced in the CAF represent specifications for operational data structures and processes—not the data structures and processes themselves. What do we mean by this? This is essentially the difference between specifications for a thing and the thing itself. Specifications for an object capture all its essential qualitative and quantitative characteristics and provide clear and rigorous guidelines to implement instances of that design object.

Our example student model as a design object specifies all aspects of an operational student model—its variables and the statistical characteristics of their relationships and interactions, as well as the nature of the processing necessary to 'run' it. But our student model as a design object does not actually include the functions or processes that make the model 'run'—in this case the routines responsible for actually propagating evidence throughout the model (updating it). Our student model also does not represent the state of any particular student's knowledge, skill or ability. In an operational assessment each student will have their own copy, or instance, of the student model (sometimes referred to as a score model) which will be updated using the specific outcomes of their specific performances on specific tasks.

Further, any given implementation of a particular design object will vary to the extent that multiple instances satisfy the design specifications. For example, specifications for a subtraction task that include a task feature for the minuend that calls for the use of a two digit integer and a task feature for the subtrahend that calls for use of a single integer could generate many instances of subtraction problems that satisfy those criteria.

To continue, any evidence model contains evidence (evaluation) rules that are applicable to the related work product(s) from any instance of a task described in the task model (or skeleton) to which it is linked. The statistical portion of any evidence model describes the generalized relationship between each and every observable produced by the evidence rules and student model variables, both with respect to the structure of the relationship and the weights (direction and magnitude of updating student model variables) of the observables. An evidence model does not represent an instance of how to produce observables for a particular instance of a task, but rather for how to produce observables for a set of tasks with common characteristics. By the same token, the statistical portion of an evidence model characterizes the average relationship between its' observables and student model variables, as opposed to relationships that are particularized to any given task.

To this point we have considered only functionality in the Portal Assessment Design System related to design and design objects. However, the tool system also includes some special-purpose capabilities for implementation of state-of-the-art student and evidence models: export of student and evidence models as compiled Bayes networks compatible for use with an evidence accumulation process (see 4-Process Delivery architecture) incorporating the ERGO™ (Noetic Systems) Inference Engine. The Portal Assessment Design System also includes generation of the assessment description file, another implementation capability required for use of this same kind of evidence accumulation process.

Other Uses of the Portal Assessment Design System

The detailed example we have just worked through describes how one would design a new assessment from scratch. Portal can be used for other purposes as well, all of which come into play once a repository of design objects has been created. All these other uses, therefore, fall into the category of re-use of design objects and include (but are not limited to)

Targeted item writing: A subset of design objects for an assessment, such as task specifications and their linked evidence models, can be used to generate assessment product tasks with predictable statistical performance characteristics to augment task (item) pools (or vats).

Fairness/accessibility for special populations: A collection of design objects that specifies an assessment for a standard population can be re-used to incorporate the modifications necessary to accommodate one or more special populations (i.e., populations with non-standard demographic or background variables, such as learning/physical disabilities or language proficiency issues). The benefit in using the evidence-centered design methodology as embedded in the tool system is that the validity argument for a specific population engaging with an assessment is made explicit through a design process that assures coherence between population characteristics, required evidence and/or salient features of performance situations.

Development of spin-off products: A collection of design objects that specifies an assessment can be re-used to incorporate the modifications necessary to specify one or more additional members of a family of assessment products. For example, elements of a design for a high-stakes biology assessment can be re-used in the design of a related biology learning assessment.

Development of new products: Elements of collections of design objects for different assessments can be reused/recombined to develop new assessment product(s).

While this invention has been described in conjunction with the specific embodiments thereof, it is evident that many alternatives, modifications and variations will be apparent to those skilled in the art. There are changes that may be made without departing from the spirit and scope of the invention.

REFERENCES FOR ASSESSMENT DESIGN REPRESENTATIVE OF PRIOR ART

Bejar, I. I. (1985). Speculations on the future of test design. In S. E. Embretson (Ed.), Test Design: Developments in psychology and psychometrics. Orlando, Fla.: Academic Press.

Carpenter, P. A., Just, M. A., & Shell, P. (1990). What One Intelligence Test Measures: A theoretical account of the processing in the Raven Progressive Matrices Test. Pittsburgh, Pa.: Carnegie-Mellon University.

Cross, K. P., Wiggins, G. P. & Hutchings, P. (1990). Assessment 1990: Understanding the Implications. American Association for Higher Education Assessment Forum. Washington, D.C.: AAHE.

Embretson, S. E. (1998). A cognitive design system approach to generating valid tests: Application to abstract reasoning. Psychological Methods, 3, 380-396.

Embretson, S. E. (1985). Multicomponent latent trait models for test design. In S. E. Embretson (Ed.), Test Design: Developments in psychology and psychometrics. Orlando, Fla.: Academic Press.

Foa, U. G. (1965). New developments in facet design and analysis. Psychological Review, 72, 262-274.

Hively, W., Patterson, H. L., & Page, S. H. (1968). A 'universe-defined' system of arithmetic achievement tests. Journal of Educational Measurement, 5, 275-290.

Homke, L. F. and Habon, M. W. (1986). Rule-based item bank construction and evaluation within the linear logistic framework. Applied Psychological Measurement, 10, 369-380.

Messick, S. (1994). The interplay of evidence and consequences in the validation of performance assessments. Educational Researcher, 23(2), 13-23.

Mayer, R. E. (1981). Frequency norms and structural analysis of algebra story problems into families, categories, and templates. Instructional Science, 10, 135-175.

Osborn, H. G. (1968). Item sampling for achievement testing. Educational and Psychological Measurement, 28, 95-104.

Osterlind, S. J. (1999). Constructing test items: Multiple-choice, constructed response, performance, and other formats. Journal of Educational Measurement, 36, 267-270.

Sternberg, R. J. and McNamara, T. P. (1985). The representation and processing of information in real-time verbal comprehension. In S. E. Embretson (Ed.), Test Design: Developments in psychology and psychometrics. Orlando, Fla.: Academic Press.

Wiggins, G. P. & McTighe, J. (1998). Understanding by Design. Alexandria, Va.: Association for Supervision and Curriculum Development.

Wiggins, G. P. (1998). Educative Assessment: Designing assessments to inform and improve student performance. San Francisco: Josey-Bass Publishers.

Wiggins, G. P. (1993). Assessing student performance. San Francisco: Josey-Bass Publishers.

Wiley, D. E. and Haertel, E. H. (1996). Extended Assessment Tasks: Purposes, definitions, scoring, and accuracy. In M. Kane and R. Mitchell (Eds.), Implementing Performance Assessment (pp. 61-89). Mahwah, N.J.: Lawrence Erlbaum Associates.

1. REFERENCES FOR EVIDENCE-CENTERED ASSESSMENT DESIGN (OUR NEW ART)

Publications:

Mislevy, R. J., Steinberg, L. S., & Almond, R. G. (in press). On the roles of task model variables in assessment design. In S. Irvine & P. Kyllonen (Eds.), Generating items for cognitive tests: Theory and practice. Hillsdale, N.J.: Erlbaum.

R. Almond, L. Dibello, F. Jenkins, R. Mislevy, L. Steinberg, D. Yan (2001). Models for conditional probability tables in educational assessment. In T. Jaakkola & T. Richardson (Eds.), Artificial Intelligence and Statistics 2001: Proceedings of the Eighth International Workshop (137-143). San Francisco, Calif.: Morgan Kaufmann Publishers.

R. Mislevy, L. Steinberg, J. Breyer, L. Johnson, & R. Almond (in press). Making sense of data from complex assessments. Applied Measurement in Education.

Mislevy, R. J., Steinberg, L. S., Almond, R. G., Haertel, G., & Penuel, W. (in press). Leverage points for improving educational assessment. In B. Means & G. Haertel (Eds.), Evaluating the effects of technology in education. Hillsdale, N.J.: Erlbaum.

Cameron, C. A., Beemsterboer, P. L., Johnson, L. A., Mislevy, R. J., Steinberg, L. S., & Breyer, F. J. (1999). A cognitive task analysis for dental hygiene. Journal of Dental Education, 64, 333-351.

Almond, R. G., Herskovits, E., Mislevy, R. J., and Steinberg, L. S. (1999). Transfer of information between system and evidence models. In D. Heckerman & J. Whittaker (Eds.), Artificial Intelligence and Statistics 99 (pp. 181-186). San Francisco: Morgan Kaufmann.

Mislevy, R. J., Almond, R. G., Yan, D., & Steinberg, L. S. (1999). Bayes nets in educational assessment: Where do the numbers come from? In K. B. Laskey & H. Prade (Eds.), Proceedings of the Fifteenth Conference on Uncertainty in Artificial Intelligence (437-446). San Francisco: Morgan Kaufmann Publishers, Inc.

Mislevy, R. J., Steinberg, L. S., Breyer, F. J., Almond, R. G., & Johnson, L. (1999). A cognitive task analysis, with implications for designing a simulation-based assessment system. Computers and Human Behavior, 15, 335-374.

Mislevy, R. J., Steinberg, L. S., & Almond, R. G. (in press). On the roles of task model variables in assessment design. In S. Irvine & P. Kyllonen (Eds.), Generating items for cognitive tests: Theory and practice. Hillsdale, N.J.: Erlbaum.

Gitomer, D. H. and Steinberg, L. S. (1999). Representational issues in assessment design. Chapter in Sigel, I. (Ed.) The Development of Representational Thought: Theories and Applications. Hillsdale, N.J.: Erlbaum Steinberg, L. S. and Gitomer, D. H. (1996). Intelligent tutoring and assessment built on an understanding of a technical problem-solving task. Instructional Science, 24 223-258.

Gitomer, D. H., Steinberg, L. S. and Mislevy, R. J. (1995). Diagnostic assessment of troubleshooting skill in an intelligent tutoring system. Chapter in Nichols, P., Chipman, S. and Brennan, S. (Eds.) Cognitively Diagnostic Assessment. Hillsdale, N.J.: Erlbaum.

Steinberg, L. S. and Gitomer, D. H. (1993). Cognitive task analysis, interface design, and technical troubleshooting. In W. D. Gray, W. Hefley and D. Murray (Eds.), 1993 International Workshop on Intelligent User Interfaces. New York: ACM. Also published as ETS Research Report RR-92-73.

Steinberg, L. S. and Gitomer, D. H. (1993). Cognitive task analysis and interface design in a technical troubleshooting domain. Knowledge-Based Systems. 6, 249-257.

Wainer, H. and Steinberg, L. S. (1992). Sex differences in performance on the mathematics section of the Scholastic Aptitude Test: Bidirectional Validity Study. Harvard Educational Review, 62, 323-336.

Technical Reports:

Mislevy, R. J., Steinberg, L. S., & Almond, R. G. (1998). A note on knowledge-based model construction in educational assessment. CSE Technical Report 480. Los Angeles: The National Center for Research on Evaluation, Standards, Student Testing (CRESST), Center for Studies in Education, UCLA.

Mislevy, R. J., Steinberg, L. S., & Almond, R. G. (1999). On the roles of task model variables in assessment design. CSE Technical Report 500. Los Angeles: The National Center for Research on Evaluation, Standards, Student Testing (CRESST), Center for Studies in Education, UCLA.

Mislevy, R. J., Steinberg, L. S., Breyer, F. J., Almond, R. G., & Johnson, L. (1988) A cognitive task analysis, with implications for designing a simulation-based assessment system. CSE Technical Report 487. Los Angeles: The National Center for Research on Evaluation, Standards, Student Testing (CRESST), Center for Studies in Education, UCLA.

Almond, R. G., Steinberg, L. S., & Mislevy, R. J. (in press). A sample assessment using the four process framework Los Angeles: The National Center for Research on Evaluation, Standards, Student Testing (CRESST), Center for Studies in Education, UCLA.

Presentations:

R. Mislevy, J. Behrens, M. Bauer, L. Steinberg, D. Williamson (2001). How to create complex measurement models. Presented at the annual meeting of the National Council of Measurement in Education, Seattle, Wash., April, 2001.

R. Mislevy, R. Almond & L. Steinberg (1999). Evidentiary considerations in performance assessment. Presented at the annual meeting of the National Council of Measurement in Education, Montreal, Canada, April, 1999.

Mislevy, R. J., Almond, R. G., & Steinberg, L. S. "Task design, student modeling, and evidentiary reasoning in complex educational assessments." Poster session presented at the 1997 Joint Statistical Meetings, under ASA Section on Bayesian Statistics, August 1997, Los Angeles, Calif.

Almond, R. G., Mislevy, R. J., and Steinberg, L. S. Using prototype-instance hierarchies to model global dependence. AMS Summer Research Conference on Graphical Markov Models, Influence Diagrams, and Bayesian Belief Networks. July 1997, Seattle, Wash.

Mislevy, R. J., Steinberg, L. S., & Almond, R. G. "Evidence-centered assessment design." Presented at the annual conference of the National Center for Research on Evaluation, Standards, Student Testing (CRESST), University of California at Los Angeles, Sep. 9-11, 1998.

Mislevy, R. J., Almond, R. G., & Steinberg, L. S. "Leverage points for improving educational assessment." Presented to the National Academy of Science's Committee on National Statistics, Washington, D.C., Oct. 30, 1998.

Mislevy, R. J., Steinberg, L. S., & Almond, R. G. "On the roles of task model variables in assessment design." Presented at the conference "Generating items for cognitive tests: Theory and practice", co-sponsored by Educational Testing Service and the United States Air Force Laboratory and held at the Henry Chauncey Conference Center, Educational Testing Service, Princeton, N.J., Nov. 56, 1998.

Mislevy, R. J., Steinberg, L. S., Breyer, F. J., Almond, R. G., & Johnson, L. "A cognitive task analysis, with implications for designing a simulation-based assessment system." Paper presented at the annual meeting of the American Educational Research Association, Montreal, Canada, April, 1999.

Mislevy, R. J., Almond, R. G., & Steinberg, L. S. "Evidentiary considerations in performance assessment." Presented at the annual meeting of the National Council of Measurement in Education, Montreal, Canada, April, 1999.

Mislevy, R. J., Almond, R. G., Yan, D., & Steinberg, L. S. "Bayes nets in educational assessment: Where the numbers come from." Presented at Uncertainty in Artificial Intelligence, Stockholm, Sweden, August, 1999.

White Papers:

R. Almond, A. Matukhin, L. Steinberg, D. Williamson, D. Yan. A framework for evidence accumulation. This white paper describes an abstract model for accumulating evidence about examinee proficiency across multiple assessment tasks and describes how this Evidence Accumulation Process functions with multiple scoring methodologies.

R. Almond, L. Steinberg, & R. Mislevy (1999). A sample assessment using the four process framework. White paper prepared for the IMS Working Group on Question and Test Inter-Operability. Princeton, N.J.: Educational Testing Service.

What is claimed is:

1. A computer-implemented method of designing large numbers of varying assessment tasks for inclusion on different versions of an assessment to be administered in a computer-based assessment, the method comprising:

generating, using a processing system, a plurality of trifles, each trifle being based on subject matter information or requirements information, wherein a first trifle provides a reference to a source of the subject matter information and a second trifle provides the requirements information on which the trifle is based for subsequent access to the source, wherein the subject matter information is related to one or more subject matters of an assessment, and wherein the requirements information is related to one or more requirements for the assessment;

generating, using the processing system, one or more task model data structures, a particular task model data structure (i) defining features of a group of tasks having similar content and response requirements, and (ii) being based on the first trifle and the second trifle; and generating, using the processing system, a plurality of varying assessment tasks and corresponding evidence models for scoring responses received for those varying assessment tasks, wherein each task is based on the particular task model data structure, and wherein at least one of the varying assessment tasks based on the particular task model data structure is included on each of a plurality of versions of the assessment, wherein the at least one varying assessment task having content that differs from all other variants produced using the particular task model data structure is generated in real time during administration of an assessment on which the at least one varying assessment task appears after a response to a previous assessment task is received via a computer network;

wherein the at least one varying assessment task is transmitted over the computer network and displayed on a graphical user interface during administration of the assessment.

2. The method of claim 1, wherein each trifle of the one or more trifles comprises a note, and wherein the note categorizes a piece of information in the subject matter information or the requirements information.

3. The method of claim 2, wherein the piece of information is categorized into a single category of a plurality of categories, the plurality of categories including:
- a first category indicating that the piece of information describes a subject matter domain;
- a second category indicating that the piece of information describes a characteristic of an existing assessment related to the subject matter domain; and
- a third category indicating that the piece of information describes a non subject matter assessment requirement.

4. The method of claim 3, wherein the first category and the second category each include a plurality of sub-categories for further categorizing the piece of information, and wherein the third category does not include a sub-category.

5. The method of claim 2, wherein the piece of information is categorized into one or more categories of a plurality of categories, the plurality of categories including:
- a first category indicating that the piece of information describes knowledge of value for a particular subject matter domain;
- a second category indicating that the piece of information describes an activity of value for the particular subject matter domain; and
- a third category indicating that the piece of information describes a behavioral pattern that distinguishes levels of proficiency within the particular subject matter domain.

6. The method of claim 1, further comprising:
- generating, using the processing system, one or more student models, each student model (i) defining knowledge evidence, skill evidence, or ability evidence accumulated via the assessment, and (ii) being based on at least one trifle of the one or more trifles,
- wherein the assessment comprises the one or more student models and the one or more tasks.

7. The method of claim 6, wherein generating a student model comprises specifying statistical relationships between multiple variables in the student model.

8. The method of claim 7, further comprising:
- generating, using the processing system, one or more evidence models using, each evidence model (i) defining a relationship between the knowledge evidence, the skill evidence, or the ability evidence and a variable of the multiple variables in the student model, and (ii) being based on at least one trifle of the one or more trifles.

9. The method of claim 1, wherein each task model of the one or more task models is based on a task feature trifle of the one or more trifles, and wherein the task feature trifle indicates that a piece of information included in the subject matter information or the requirements information describes the features of the group of tasks.

10. The method of claim 1, wherein the one or more trifles are generated and managed using a graphical user interface (GUI).

11. The method of claim 1, wherein the one or more trifles categorize a plurality of pieces of information in the subject matter information or the requirements information, the method further comprising:
- receiving second subject matter information or second requirements information based on the categorizing of the plurality of pieces of information.

12. The method of claim 1, wherein each task model data structure is based on the at least one trifle, and wherein the at least one trifle is identified via a computer-implemented keyword search.

13. The method of claim 1, wherein each trifle comprises information pertaining to one or more of the following:
- knowledge of value for a particular subject matter;
- an activity of value for the particular subject matter;
- a behavioral pattern that distinguishes levels of proficiency in the particular subject matter; and
- a feature of a task related to the particular subject matter.

14. A system for designing large numbers of varying assessment tasks for inclusion on different versions of an assessment to be administered in a computer-based assessment, the system comprising:
- a processing system;
- computer readable memory encoded with instructions which, when executed, cause the processing system to execute steps comprising:
  - generating a plurality of trifles, each trifle being based on subject matter information or requirements information, wherein a first trifle provides a reference to a source of the subject matter information and a second trifle provides the requirements information on which the trifle is based for subsequent access to the source, wherein the subject matter information is related to one or more subject matters of an assessment, and wherein the requirements information is related to one or more requirements for the assessment;
  - generating one or more task model data structures, a particular task model data structure (i) defining features of a group of tasks having similar content and response requirements, and (ii) being based on the first trifle and the second trifle; and
  - generating, using the processing system, a plurality of varying assessment tasks and corresponding evidence models for scoring responses received for those varying assessment tasks, wherein each task is based on the particular task model data structure, and wherein at least one of the varying assessment tasks based on the particular task model data structure is included on each of a plurality of versions of the assessment, wherein the at least one varying assessment task having content that differs from all other variants produced using the particular task model data structure is generated in real time during administration of an assessment on which the at least one varying assessment task appears after a response to a previous assessment task is received via a computer network;
  - wherein the at least one varying assessment task is transmitted over the computer network and displayed on a graphical user interface during administration of the assessment.

15. The system of claim 14, wherein each trifle of the one or more trifles comprises a note, and wherein the note categorizes a piece of information in the subject matter information or the requirements information.

16. The system of claim 15, wherein the piece of information is categorized into a single category of a plurality of categories, the plurality of categories including:
- a first category indicating that the piece of information describes a subject matter domain;
- a second category indicating that the piece of information describes a characteristic of an existing assessment related to the subject matter domain; and
- a third category indicating that the piece of information describes a non subject matter assessment requirement.

17. The system of claim 14, wherein the one or more trifles categorize a plurality of pieces of information in the subject matter information or the requirements information, and wherein the steps executed by the processing system further comprise:
  receiving second subject matter information or second requirements information based on the categorizing of the plurality of pieces of information.

18. The system of claim 14, wherein each task model data structure is based on the at least one trifle, and wherein the at least one trifle is identified via a computer-implemented keyword search.

19. The system of claim 14, wherein each trifle comprises information pertaining to one or more of the following:
  knowledge of value for a particular subject matter;
  an activity of value for the particular subject matter;
  a behavioral pattern that distinguishes levels of proficiency in the particular subject matter; and
  a feature of a task related to the particular subject matter.

20. A non-transitory computer-readable storage medium for causing a computer system to design large numbers of varying assessment tasks for inclusion on different versions of an assessment to be administered in a computer-based assessment, the computer readable storage medium comprising computer executable instructions which, when executed, cause the computer system to execute steps comprising:
  generating, using a processing system, a plurality of trifles, each trifle being based on subject matter information or requirements information, wherein a first trifle provides a reference to a source of the subject matter information and a second trifle provides the requirements information on which the trifle is based for subsequent access to the source, wherein the subject matter information is related to one or more subject matters of an assessment, and wherein the requirements information is related to one or more requirements for the assessment;
  generating, using the processing system, one or more task model data structures using, a particular task model data structure (i) defining features of a group of tasks having similar content and response requirements, and (ii) being based on the first trifle and the second trifle; and
  generating, using the processing system, a plurality of varying assessment tasks and corresponding evidence models for scoring responses received for those varying assessment tasks, wherein each task is based on the particular task model data structure, and wherein at least one of the varying assessment tasks based on the particular task model data structure is included on each of a plurality of versions of the assessment, wherein the at least one varying assessment task having content that differs from all other variants produced using the particular task model data structure is generated in real time during administration of an assessment on which the at least one varying assessment task appears after a response to a previous assessment task is received via a computer network;
  wherein the at least one varying assessment task is transmitted over the computer network and displayed on a graphical user interface during administration of the assessment.

* * * * *